US010009668B2

(12) United States Patent
Liboiron-Ladouceur et al.

(10) Patent No.: US 10,009,668 B2
(45) Date of Patent: Jun. 26, 2018

(54) METHODS AND SYSTEMS FOR BOARD LEVEL PHOTONIC BRIDGES

(71) Applicant: THE ROYAL INSTITUTION FOR THE ADVANCEMENT OF LEARNING/ MCGILL UNIVERSITY, Montreal (CA)

(72) Inventors: Odile Liboiron-Ladouceur, Montreal (CA); Md. Shafiqul Hai, Montreal (CA); Monireh Moayedi Pour Fard, Montreal (CA); Chunshu Zhang, Montreal (CA); Meer Sakib, Montreal (CA)

(73) Assignee: THE ROYAL INSTITUTION FOR THE ADVANCEMENT OF LEARNING / MCGILL UNIVERSITY, Montreal (CA)

( * ) Notice: Subject to any disclaimer, the term of this patent is extended or adjusted under 35 U.S.C. 154(b) by 0 days. days.

(21) Appl. No.: 14/955,142

(22) Filed: Dec. 1, 2015

(65) Prior Publication Data

US 2016/0156999 A1 Jun. 2, 2016

Related U.S. Application Data

(60) Provisional application No. 62/085,938, filed on Dec. 1, 2014.

(51) Int. Cl.
*H04J 14/00* (2006.01)
*H04B 10/00* (2013.01)
(Continued)

(52) U.S. Cl.
CPC ....... *H04Q 11/0005* (2013.01); *H04B 10/801* (2013.01); *H04Q 2011/005* (2013.01);
(Continued)

(58) Field of Classification Search
None
See application file for complete search history.

(56) References Cited

U.S. PATENT DOCUMENTS 6,535,313 B1* 3/2003 Fatehi ................. H04J 14/0227
398/101
7,272,309 B1* 9/2007 Tamil ..................... H04L 45/62
370/351
(Continued)

OTHER PUBLICATIONS

Narasimha et al, "An Ultra Low Power CMOS Photonics Technology Platform for H/S Optoelectronic Transceivers at Less than $1 per Gbps", OFC Conference, Paper OMV-4, 2010, ISBN 978-1-55752-885-8, all pages, USA.
Liboiron-Ladouceur et al, "Optically Interconnected High-Performance Servers", SPIE 8412, Photonics North, 2012, pp. 1-5, Canada.
(Continued)

*Primary Examiner* — Oommen Jacob
(74) *Attorney, Agent, or Firm* — Norton Rose Fulbright Canada LLP; Alexandre Daoust

(57) ABSTRACT

As photonics evolves closer and closer to the electronic processing elements in order to meet the demands of speed, latency of evolving data communications networks and data centers the inventors, rather than seeking direct monolithically integrated CMOS based processing photonic and electronic elements, have established a different route. Namely replace the computer hubs/electrical bridges interconnecting the multiple core logic chipset elements with a photonic bridge. In this manner high risk chip-to-chip photonic point-to-point links are replaced with photonic SOCs that leverage photonics bandwidth density attribute rather than its bandwidth distance attributes. An SOI based Electronic Embedded Photonic Switching Fabric is presented supporting, for example, N×MGb/s interconnections exploiting N channels of MGb/s wherein each channel of exploits S WDM channels of TGb/s. Embodiments of the invention also support
(Continued)

high density optical interconnection via vertical grating couplers and multicore fibers.

1 Claim, 15 Drawing Sheets

(51) Int. Cl.
  *H04J 14/02* (2006.01)
  *H04Q 11/00* (2006.01)
  *H04B 10/80* (2013.01)
(52) U.S. Cl.
  CPC ........ *H04Q 2011/0016* (2013.01); *H04Q 2011/0022* (2013.01); *H04Q 2011/0028* (2013.01); *H04Q 2011/0032* (2013.01)

(56) References Cited

U.S. PATENT DOCUMENTS

| | | | |
|---|---|---|---|
| 8,965,203 B1* | 2/2015 | Vahdat | H04J 14/0282 385/16 |
| 2004/0165246 A1* | 8/2004 | Carlson | G02B 26/02 359/245 |
| 2014/0269351 A1* | 9/2014 | Graves | H04L 49/10 370/250 |
| 2016/0066070 A1* | 3/2016 | Trausch | H04Q 11/0003 398/45 |

OTHER PUBLICATIONS

Liboiron-Ladouceur et al, "The Data Vortex Optical Packet Switched Interconnection Network", Journal of Lightwave Tech., vol. 26, No. 13, 2008, pp. 1777-1789, USA.
Mishafiei et al, "A Silicon Photonic Switch for Optical Interconnects", Photonics North, Jun. 2013, p. 186, Canada.
Taillaert et al, "Grating Couplers for Coupling between Optical Fibers and Nanophotonic Waveguides", Japanese Journal of Applied Physics, vol. 45, No. 8A, Aug. 4, 2006, pp. 6071-6077, Japan.
Chen et al, "Two Dimensional Silicon Waveguide Chirped Grating Couplers for Vertical Optical Fibers", Optics Comm., vol. 283, No. 10, pp. 2146-2149, Jan. 21, 2010, China.
Gunn, "CMOS Photonics for High-Speed Interconnects", J. Microelectronics, vol. 26, pp. 58-66, Mar.-Apr. 2006, USA.
Xu et al, "Micrometre-Scale Silicon Electro-Optic Modulator", Nature, vol. 435, No. 7040, May 2005, pp. 325-327, USA.
Pathak et al in "Optimized Silicon AWG with Flattened Spectral Response Using an MMI Aperture", Journal of Lightwave Tech., vol. 31, No. 1, pp. 87-93, Jan. 1, 2013, USA.
Lamponi et al, "Low-Threshold Heterogeneously Integrated InP/SOI Lasers with a Double Adiabatic Taper Coupler", Photonics Technology Letters, vol. 24, No. 1, Jan. 1, 2012, pp. 76-78, USA.
Fang et al, "Hybrid Silicon Evanescent Devices", Materials Today, vol. 10, No. 7-8, pp. 28-35, Jul.-Aug. 2007, USA.
Campenhout et al, "A Compact SOI-Integrated Multiwavelength Laser Source Based on Cascaded InP Microdisks", Photonics Technology Letters, vol. 20, No. 16, Aug. 15, 2008, pp. 1345-1347, USA.

* cited by examiner

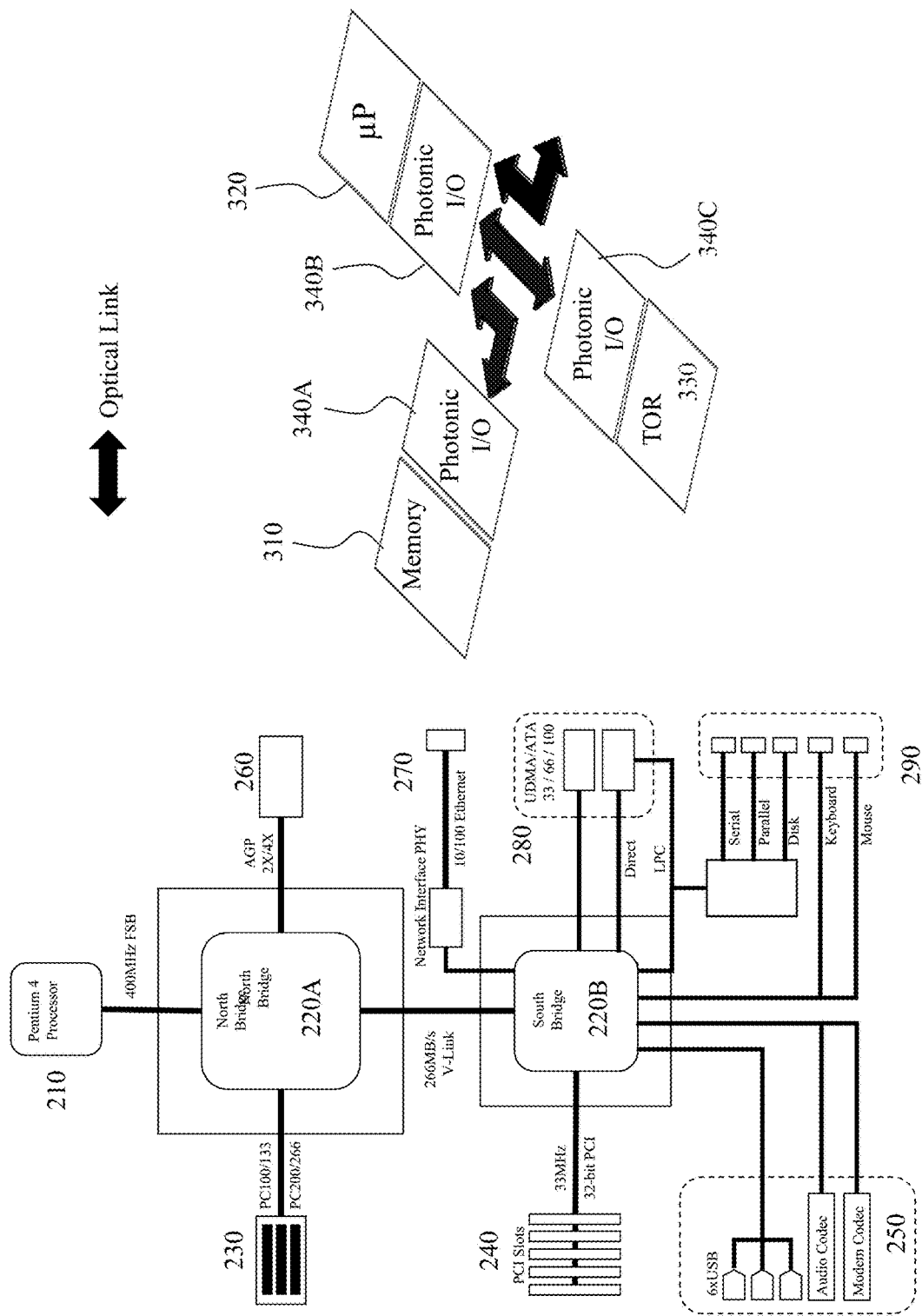

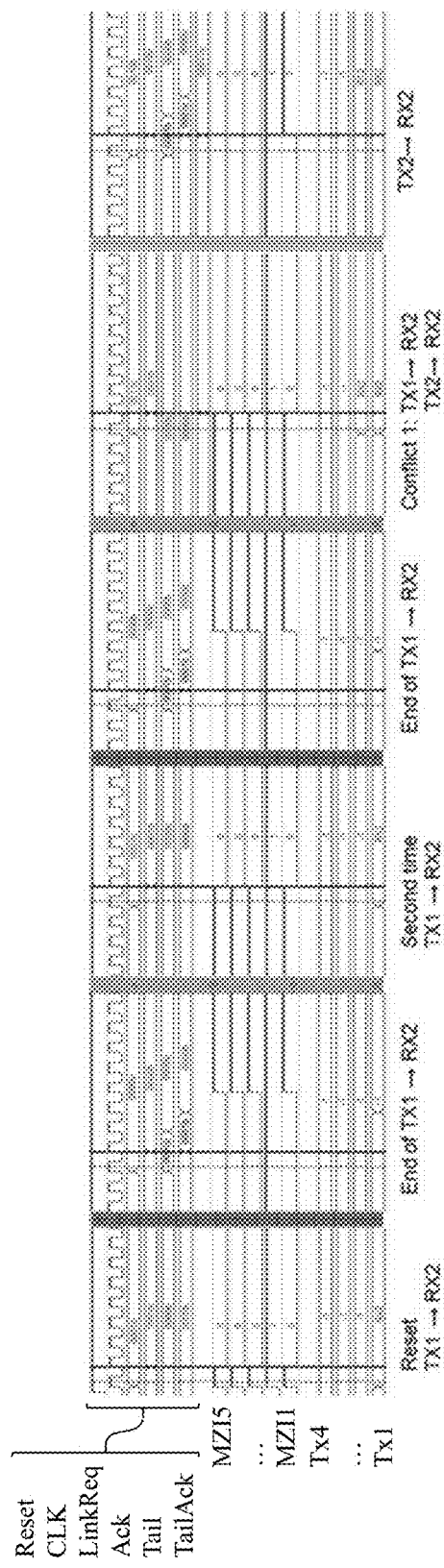
Figure 13A
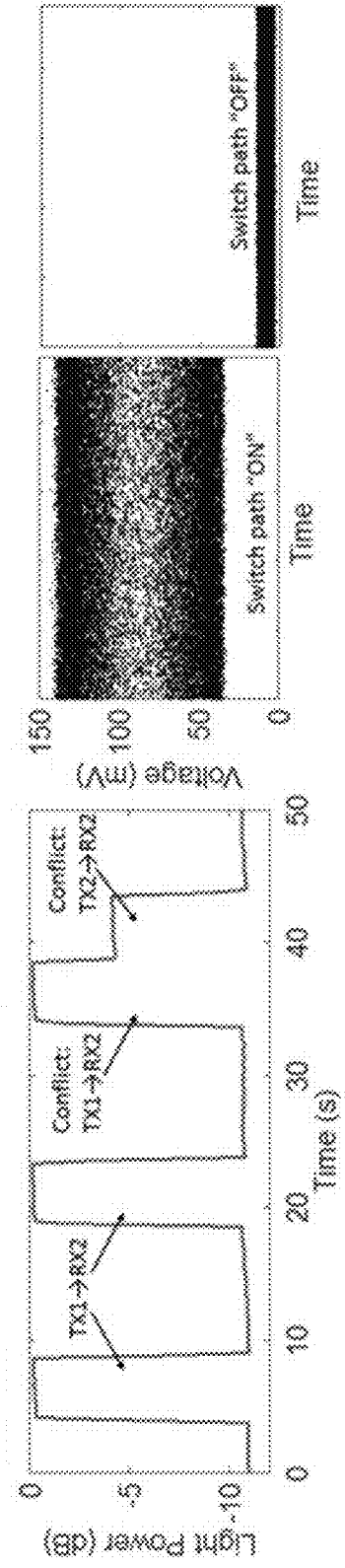
Figure 13B
Figure 13C

METHODS AND SYSTEMS FOR BOARD LEVEL PHOTONIC BRIDGES

CROSS-REFERENCE TO RELATED APPLICATIONS

This patent application claims the benefit of priority from U.S. Provisional Patent Application 62/085,938 filed Dec. 1, 2014 entitled "Methods and Systems for Board Level Photonic Bridges", the entire contents of which are incorporated herein by reference.

FIELD OF THE INVENTION

This invention relates to optical interconnects and more particularly to providing monolithic circuit level photonic switching fabrics (bridges).

BACKGROUND OF THE INVENTION

Whilst the origins of the Internet or World Wide Web reach back to US Government research in the 1960s for robust, fault-tolerant communications via computer networks it was only in early to mid-1980s that funding of a new U.S. backbone, as well as private funding for other commercial backbones, led to worldwide participation in the development of new networking technologies, and merging of networks globally. By the 1990s the commercialization of what was now an international network together with reducing costs and increasing performance of microprocessors resulted in its popularization and incorporation into virtually every aspect of modern human life. As of June 2012, more than 2.4 billion people, over a third of the world's human population, have used the services of the Internet representing approximately a 100 fold increase since 1995.

Over the same period the Internet has grown to not only change the way individuals and businesses obtain and exploit information globally but also how we store and move information as well as the permanence of information within the Internet. Over this period geographically distributed data centers have become the facilities that store and distribute the data on the Internet replacing libraries as the repositories of human knowledge. With an estimated 100 billion plus web pages on over 100 million websites, data centers contain a lot of data. With over 2 billion users accessing these websites, including a growing amount of high bandwidth video in addition to data, it's easy to understand but hard to comprehend how much data is being uploaded and downloaded every second on the Internet. At present the compound annual growth rate (CAGR) for global IP traffic between users is between 40% based upon Cisco's analysis (see http://www.cisco.com/en/US/solutions/collateral/ns341/ns525/ns537/ns705/ns827/white_paper_c11-481360_ns827_Networking_Solutions_White Paper.html) and 50% based upon the University of Minnesota's Minnesota Internet Traffic Studies (MINTS) analysis. By 2016 this user traffic is expected to exceed 100 exabytes per month, over 100,000,000 terabytes per month, or over 42,000 gigabytes per second. However, peak demand will be considerably higher with projections of over 600 million users streaming Internet high-definition video simultaneously at peak times.

All of this data flowing to and from users comes via data centers and accordingly also flows between data centers and within data centers as so that these IP traffic flows must be multiplied many times to establish total IP traffic flows. Data centers are filled with tall racks of electronics surrounded by cable racks where data is typically stored on big, fast hard drives. Servers are computers that take requests and move the data using fast switches to access the right hard drives. Routers connect the servers to the Internet. At the same time as applications such as cloud computing increase computing platforms are no longer stand alone systems but homogenous interconnected computing infrastructures hosted in massive data centers known as warehouse scale computers (WSC) which provide ubiquitous interconnected platforms as a shared resource for many distributed services with requirements that are different to the traditional racks/servers of data centers.

Today, whilst requiring a cost-effective yet scalable way of interconnecting data centers and WSCs internally and to each other most datacenter and WSC applications are provided free of charge such that the operators of this infrastructure are faced not only with the challenge of meeting exponentially increasing demands for bandwidth without dramatically increasing the cost and power of their infrastructure. At the same time consumer's expectations of download/upload speeds and latency in accessing content provide additional pressure. Accordingly, in a manner similar to the backbone and LAN/WAN evolutions which support consumer's demands for download/upload speeds and latency, photonic technology is advancing into datacenters and WSCs. Currently photonic input/output (I/O) is what is generally referred to as "to the edge" or in other words, photonic technology is currently making a breakthrough in the blade edge interconnect. A blade server (known commonly as a blade) is a stripped down server computer with a modular design optimized to minimize the use of physical space and energy.

Photonics to the edge today means photonic point-to-point connections between blades and between servers replacing copper with optical fiber. Originally employing discrete photonic transmitters and receivers advances in photonic integrated circuits (PICs) have allowed, for example, for the development of a CMOS optoelectronic technology platform providing 650 mW 4×10-Gb/s 0.13 µm silicon-on-insulator integrated transceiver chip, co-packaged with an externally modulated laser, to enable high density data interconnects at <$1 per Gbps, see Narasimha et al in "An Ultra Low Power CMOS Photonics Technology Platform for H/S Optoelectronic Transceivers at Less than $1 per Gbps" (OFC Conference, Paper OMV-4, 2010, ISBN 978-1-55752-885-8). Such a CMOS implementation allows the footprint to be reduced to the point where the transceiver (and hence the signal conversion) is actually within the cable connector to the server.

Current photonic I/O developments are seeking to bring the opto-electronic (OE)/electro-optic (EO) interfaces closer to the microprocessors themselves eliminating copper interconnects and their associated power requirements and parasitics. An example of this is the Reflex Photonics LightABLE module providing 24 10 Gb/s optical channels employing multimode fiber and Vertical Cavity Surface Emitting Lasers (VCSELs) to provide configurable transmitter/receiver (Tx/Rx) combinations interfacing to parallel optical fiber ribbons for point-point and point-to-multipoint communications, see for example Liboiron-Ladouceur et al in "Optically Interconnected High-Performance Servers" (SPIE 8412, Photonics North, 2012).

However, this still leaves microprocessors interconnected by point-to-point photonic interconnections external to the microprocessors such that within the prior art the next logical step is defined as the monolithic integration of CMOS based PICs with CMOS microprocessors and the establishment of optical interconnected Systems on a Chip (SOC) such that physically large but functionally simple optical functions, such as an Optical Interconnection Network (OIN), may be replaced by a small PIC. However, despite being able to replace, for example what was a 12 port OIN exploiting semiconductor optical amplifiers in 2008 occupying a few million square millimeters, see Liboiron-Ladouceur et al in "• O. Liboiron-Ladouceur, A. Shacham, B. A. Small, B. G. Lee, H. Wang, C. P. Lai, A. Biberman, and K. Bergman, "The Data Vortex Optical Packet Switched Interconnection Network" (J. Lightwave Tech., Vol. 26, No. 13, 2008), with a few square millimeters of silicon, see Mishafiei et al in "A Silicon Photonic Switch for Optical Interconnects" (Photonics North, June 2013) we are still left with the fundamental physical limitations of diffraction for optical signals of the order of a micron in wavelength such that 40 nm, 22 nm, and 14 nm CMOS electronics will not be possible. 22 nm, and even 40 nm So whilst logically, optics will evolve closer and closer to the processing element and the prior art developments/huge investments in silicon photonics will continue the initial idea that the integration will lead to monolithically integrated CMOS based processing elements and photonics is actually not that obvious. Rather technical considerations lead to a different route, namely replace the computer hubs/electrical bridges interconnecting the multiple core logic chipset elements with a photonic bridge. In this manner high risk chip-to-chip photonic point-to-point links are replaced with photonic SOCs that leverage photonics bandwidth density attribute rather than its bandwidth distance attributes.

Accordingly, it would be beneficial to provide CMOS compatible SOC photonic bridges supporting OE and EO interfaces with space switching interconnection such that throughput limiting state-of-the-art electronic bridges, such as for example the VIA Apollo P4X266 "North Bridge" and VIA VT8233 "South Bridge" providing 64 bit 266 MHz bus connectivity, are replaced by photonic bridges supporting 16 channels at 40 Gb/s.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations of the prior art with respect to optical interconnects and more particularly to providing monolithic circuit level photonic switching fabrics (bridges).

In accordance with an embodiment of the invention there is provided a device for interconnecting a plurality of N electronic circuits comprising;
 a monolithic photonic circuit incorporating an N×N optical switch wherein,
  each input port of the N×N optical switch is coupled to M optical modulators via an M channel wavelength multiplexer;
  each output port of the N×N optical switch is coupled to M optical detectors via an M channel wavelength demultiplexer; and
  each optical modulator is coupled to an optical source via an optical coupler.

In accordance with an embodiment of the invention there is provided a device comprising:
 a photonic switch fabric comprising N inputs and M outputs, where both N and M are positive integers;
 R wavelength multiplexers, where and each wavelength multiplexer comprising S channels and coupled to an input of the photonic switch fabric;
 P wavelength demultiplexers, where and each wavelength demultiplexer comprising S channels and coupled to an output of the photonic switch fabric;
 a plurality of vertical grating couplers, a first predetermined portion of the plurality of vertical grating couplers coupled to the input channels of each of the wavelength multiplexers and a second predetermined portion of the plurality of vertical grating couplers coupled to the output channels of each of the outputs of the photonic switch fabric;
 a plurality of photodetectors, each photodetector coupled to an output channel of the wavelength demultiplexers; and
 a plurality of modulators, each modulator of the plurality of modulators coupled a predetermined input channel of a predetermined wavelength multiplexer for encoding data at onto a CW optical signal coupled to the modulator.

In accordance with an embodiment of the invention there is provided a method of interconnecting a plurality N electronic circuits which together provide the required functionality of a computer server by providing a P×Q photonic switching fabric electrically connected to the plurality N electronic circuits.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2 depicts prior art dedicated server interconnect architecture;

FIG. 3 current developments for providing photonic interconnections within a server blade;

FIGS. 13A to 13C depict timing diagrams for the main digital signals of an LUCC according to an embodiment of the invention, the optical light injected at a transmitter (Tx1)and received signal (Rx2) together with a generated 10 Gb/s payload at the Tx1 and received at Rx2.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "server", "server blade", "blade server", or "blade" as used herein may refer to, but is not limited to, a stripped down server computer with a modular design optimized to minimize the use of physical space and energy. Whereas a standard rack-mount server can function with (at least) a power cord and network cable, blade servers have many components removed to save space, minimize power consumption and other considerations, while still having all the functional components to be considered a computer. A blade enclosure, which can hold multiple blade servers, provides services such as power, cooling, networking, various interconnects and management. Together, blades and the blade enclosure form a blade system.

1. Server Blade Configurations

Figure 1:
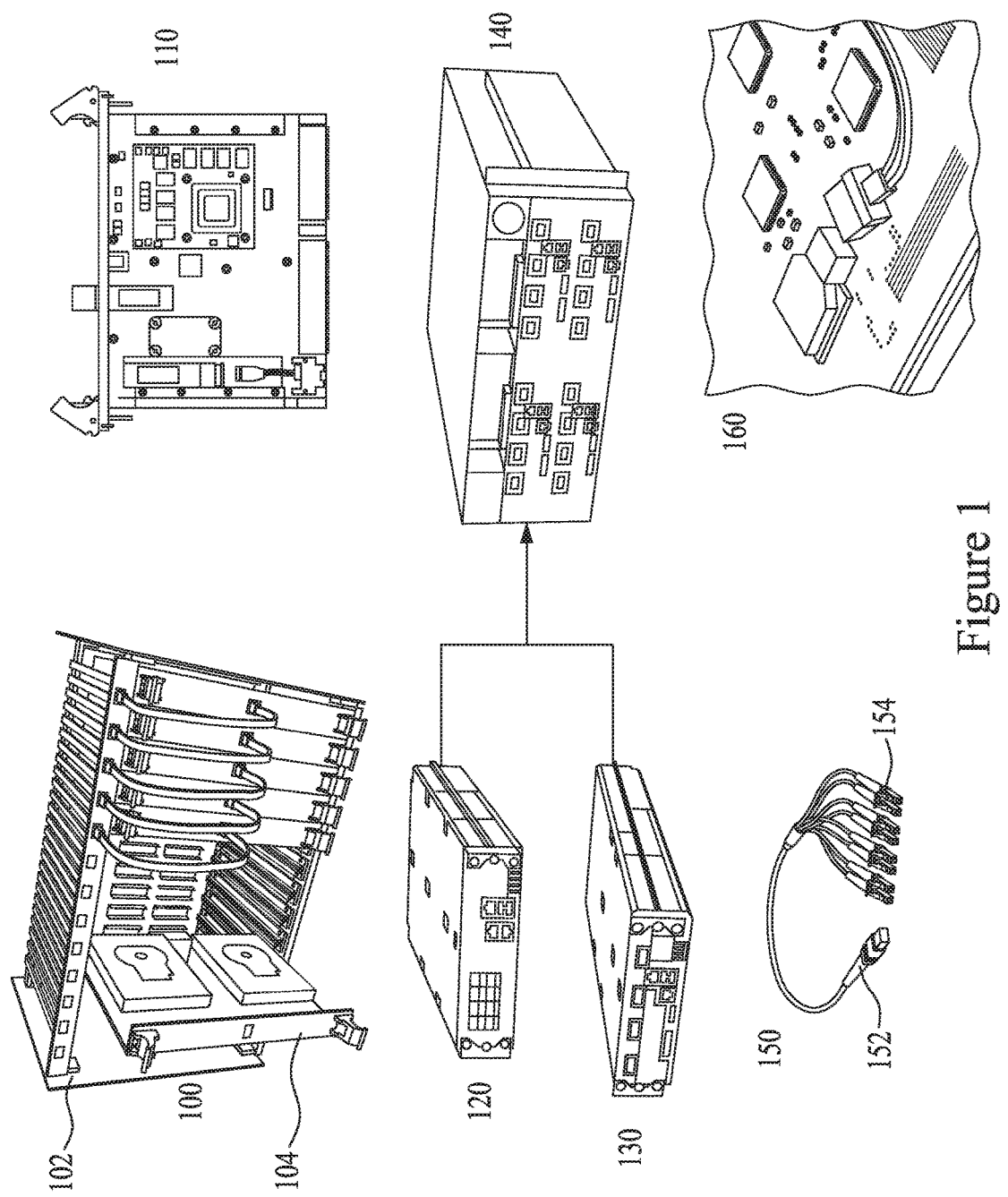
FIG. 1 depicts prior art server blade solutions employing photonics to the edge solutions.

Referring to FIG. 1 there are depicts prior art server blades employing photonics to the edge solutions including blade system 100 which comprises a rack 102 into which are slid cards 104, each card 104 being a blade. Such racks 102 are typically provided according to a standard server-rack configuration, wherein one rack unit (1U) is 19" (48 cm) wide and 1.75" (4.45 cm) high, although other configurations may be provided. These racks 102 may be discretely housed as 1U, 3U, 6U, etc. or they may form part of a standard telecom rack, e.g. a 42U rack. Embedded server 110 is, for example, a 3300GTX Embedded Server provided by CSPI which is intended to fit a 6U rack with 1" width allowing 19 such embedded servers 110 to fit into a standard 19" rack. Each embedded server 110 is configured with an NVIDIA MXM Graphics Processing Unit (GPU), 1 GB GDDR5 SDRAM, and a 56 Gb/s Quad Small Form-factor Pluggable (QSFP) transceiver 112. Accordingly, a standard telecom rack of 19" wide and 42U may host 133 embedded servers 110.

First and second servers 120 and 130 respectively depict alternative blades, represented for example by Viprion B2150 and B2250, for a chassis 140, for example Viprion 2400 which is a 17.64" wide 4U chassis. In contrast to embedded server 110 first and second servers 120 and 130 respectively support single Intel quad-core and 10-core Xeon processors representing 8 and 20 hyperthreaded logical processor cores together with 400 GB and 800 GB solid state drives. First server 120 further supports Ethernet management ports to 1 Gb/s as well as 8 1 Gb/s or 10 Gb/s enhanced small form-factor pluggable (SFP+) ports. Second server 130 also supports Ethernet management to 1 Gb/s as well as 4 40 Gb/s or 16 10 Gb/s fiber ports according to quad (4-channel) small form-factor pluggable (QSFP+) transceivers.

Each QSFP+ port on second server 130 may, for example, be interfaced to an industry-standard OM3 qualified multimode fiber optic cable with female MPO/MRP connectors at both ends. The 40 GbE bundle may be "disabled" and broken to individual 10 GbE ports using a QSFP+ breakout cable 150 which has a female MPO/MRP connector 152 at one end, which connects to the QSFP+ port of second server 130, and four LC duplex connectors 154 at the other end, which may connect to SFP+ modules on an upstream switch, for example. In an alternate photonics to the edge a LightABLE™ transceiver 160 provides 24 channels, equivalent to 12 XFP or SFP+ transceivers, via dual MT compatible 12-fiber ribbons cables. The footprint reduction achieved being that approximately 80 cm$^2$ of SFP+ transceivers is replaced with approximately 4 cm$^2$ of LightABLE™ transceiver 160.

Such prior art photonics to the edge solutions are interfaced to a blade via a network interface port of a blade such as first and second servers 120 and 130. Such a network interface typically forms part of a dedicated server interconnect architecture within a blade according to the prior art such as depicted in FIG. 2. As depicted a North Bridge 220A and South Bridge 220B are connected via a dedicated link. North Bridge 220A is also connected to Processor 210 (e.g. Pentium™ Processor), Random Access Memory (RAM) 220 (e.g. JEDEC compliant PC100/133 or PC200/266 RAM), and an Accelerated Graphics Processor 260. South Bridge 220B in addition to the North Bridge 220A is connected to Network Interface 270 which may for example be LightABLE™ transceiver 160 or another photonic interface. Additionally connected to South Bridge 220B are Peripheral Component Interconnect (PCI) slots 240, first interface set 250 (e.g. Universal Serial Bus (USB) ports and codecs), second interface set 290 (e.g. human-device interfaces), and Memory 280 which may for example comprise Ultra Direct Memory Access (UDMA) interfaced storage drives (e.g. hard disk drive (HDD) or optical disc drive) and solid state drives (SSD) (e.g. EEPROM or flash memory). For example North Bridge 220A and South Bridge 220B may be VIA Apollo P4X266 and VT8233C respectively to provide a platform for building Intel™ Pentium™ 4 processor based servers as well as workstations, and personal computers.

Accordingly, North Bridge 220A and South Bridge 220B receive all data provided to a server of which they form part and route the received data to the processor, disc drive memory, solid state memory, etc as well as retrieving processed/stored data for transmission with the Network Interface 270. Further servers exploiting common North Bridge 220A and South Bridge 220B may be implemented with a plurality of server configurations based upon, for example, the HDD/SSD memory size, read-out rate, etc. Accordingly, with servers such as the Viprion B2250 described in respect of FIG. 1 supra with 10-core Xeon processor and 800 GB memory, these generic chipsets become limiting elements in data transfer time, accessing time, etc. Accordingly, as depicted in FIG. 3 current developments for photonic interconnections seeking to reduce these electronic bottlenecks within a server blade. Accordingly, as depicted in FIG. 3 with prior art developments the intention is that the multiple server elements, e.g. Memory 310, MicroProcessor 320 and Top of Rack (TOR) Switch 330, are connected via first to third optical links (photonic interconnects) established by first to third Photonic Input/Output (I/O) interfaces 340A to 340C respectively. Accordingly, Memory 310 is connected via an optical link comprising first and second Photonic I/O interfaces 340A and 340B to Processor 340B. TOR Switch 330 is similarly connected to Processor 340B via second and third Photonic I/O interfaces 340B and 340C respectively. Processor 320 in addition to Memory 310 and TOR 330 is also connected to other circuit elements (not shown for clarity) including, but not limited, to secondary interfaces, HDD(s), and solid state memory/memories. Hence, for data to be routed from Memory 310 to TOR 330 it must be optically routed to Processor 340B from Memory 310 and then to Tor 330, and vice-versa.

2. Photonic Switching Fabric

Accordingly, the inventors have established that it would be beneficial to replace the point-to-point photonics to the circuit methodology of the prior art with a photonic switching fabric such that, for example, Memory 310 may be selectively coupled to Processor 320, TOR 330, or other blade circuits rather than only Processor 320. Such an Electronic Embedded Photonic Switching Fabric (EEPSF) being depicted in first image 400A in FIG. 4. As depicted a 4×4 Switch Architecture 420 is interfaced to 4 E/O Conversion Circuits 410 which are each interfaced to Electronics (Elect.) 430 (not shown for clarity). Accordingly, each input of the 4×4 Switch Architecture 420 is coupled to an Electronics 430 via an E/O Conversion Circuit 410 and each output of the 4×4 Switch Architecture 20 is coupled to an Electronics 430 via an E/O Conversion Circuit 410. However, it would be evident that other switch architectures may be employed according to the number of Electronics 430 which are provided within the overall system within which the EEPSF forms part, e.g. 3×3, 6×6, 8×8, 16×16, etc.

An example of an EEPSF is depicted in second image 400B wherein a 4×4 Switch 460 has first to fourth EO interfaces 440A to 440D disposed one per input port and first to fourth OE interfaces 450A to 450D disposed one per output port. As depicted the 4×4 Switch 460 comprises first to fifth 2×2 Switch Elements 460A to 460E providing a blocking photonic switch, i.e. not all connection requirements can be provided. For example both the third and fourth EO interfaces 440C and 440D cannot be routed to the first and second OE interfaces 450A and 450B respectively when all of the first to fifth 2×2 Switch Elements 460A to 460E are "digital" in that they are configurable only in bar (i.e. paths are straight through) and cross (i.e. paths cross over). Accordingly, alternate embodiments of the EEPSF may exploit other switching architectures including those that are re-arrangeably non-blocking, and strictly non-blocking A re-arrangeably non-blocking switch has non-conflicting paths for any connection mapping but the paths of other connected inputs-outputs may have to be changed or rearranged to provide the required interconnection mapping whilst a strictly non-blocking can always establish new connection mapping without disrupting or re-configuring the existing connections. However, such re-arrangably and strictly non-blocking switch fabrics require additional control complexity and numbers of switching elements and may not always be required given the Electronics 430 being interconnected. Examples of switching fabrics include, but are not limited to, crossbar, Benes, Clos, Banyan, omega network, N-stage fabrics, Spanke, and Spanke-Benes.

Depending upon the optical bandwidth of the first to fifth 2×2 Switch Elements 460A to 460E then the inputs and outputs to the 4×4 Switch 460 may be wavelength division multiplexed (WDM) such as depicted in third image 400C wherein for each input there is an Array Waveguide Grating (WDM) 465 multiplexing N wavelengths, e.g. 4, 6, 8, wherein each wavelength of the N wavelengths is generated from an Electro-Optic (E/O) Array 480 driven from a Digital Driver Circuit 470. If the N electrical signals are offset relative to each other in time then the resulting data steam can appear to a broadband photodetector as a channel operating at N×M Gb/s where M Gb/s is the data rate of each of the N channels. Accordingly, on the output a single high speed photodetector 475 receives the WDM optical stream which is then coupled to a Digital Receiver Circuit 490. Alternatively, the optical output from the optical switch 460 may be demultiplexed by a WDM and coupled to N photodetectors, each operating at M Gb/s before being coupled to the Digital Receiver Circuit 490.

Considering the current optical component manufacturing paradigm, which is based mainly on bulk optical subassemblies (OSA) from off-the-shelf discrete passive and active photonic devices, the root cause of the problem lies in a labor-intensive optical alignment and costly multiple packaging. Not only do these limit manufacturing cost efficiency but they also yield large OSAs or multiple OSAs with optical fiber interconnect. They also significantly restrict the manufacturer's ability to ramp production volumes and provide scalability in manufacturing. Accordingly, the solution lies in reducing the optical alignment and packaging content in the OSA and, eventually, replacing the optical assemblies with photonic integrated circuit (PIC) technologies, in which all the functional elements of optical circuit are monolithically integrated onto the same substrate. Then, the active optical alignment by hand is replaced by automated passive alignment, defined by means of lithography, and multiple component packaging is eliminated altogether, enabling automated and volume-scalable mass production of the complex optical components, based on existing planar technologies and semiconductor wafer fabrication techniques.

Within the context of electronic embedded photonic switching fabrics (EEPSF) monolithic integration provides for a small footprint potentially comparable to or less than the electronic circuits, such as North and South Bridges 220A and 220B respectively as described supra in respect of FIG. 2. At present the materials of choice for monolithic PICs include, but are not limited to, silicon-on-insulator (SOI) and indium phosphide (InP) with the later including related III-V semiconductors. InP based monolithic PICs allow for active and passive devices operating in the spectral ranges of interest for optical telecommunications to be combined onto the same InP substrate. SOI based PICs allow for passive device integration but require the use of either hybrid and/or heterogenous integration of the active III-V elements. Hybrid integration either exploits the attachment of discrete III-V components onto the SOI die or the exploitation of elements such as grating couplers to couple between the SOI waveguides and one or more optical fibers of the packaged active optical components. In contract to these heterogenous integration exploits evanescent coupling between one or more III-V die and the SOI die.

Figure 5:
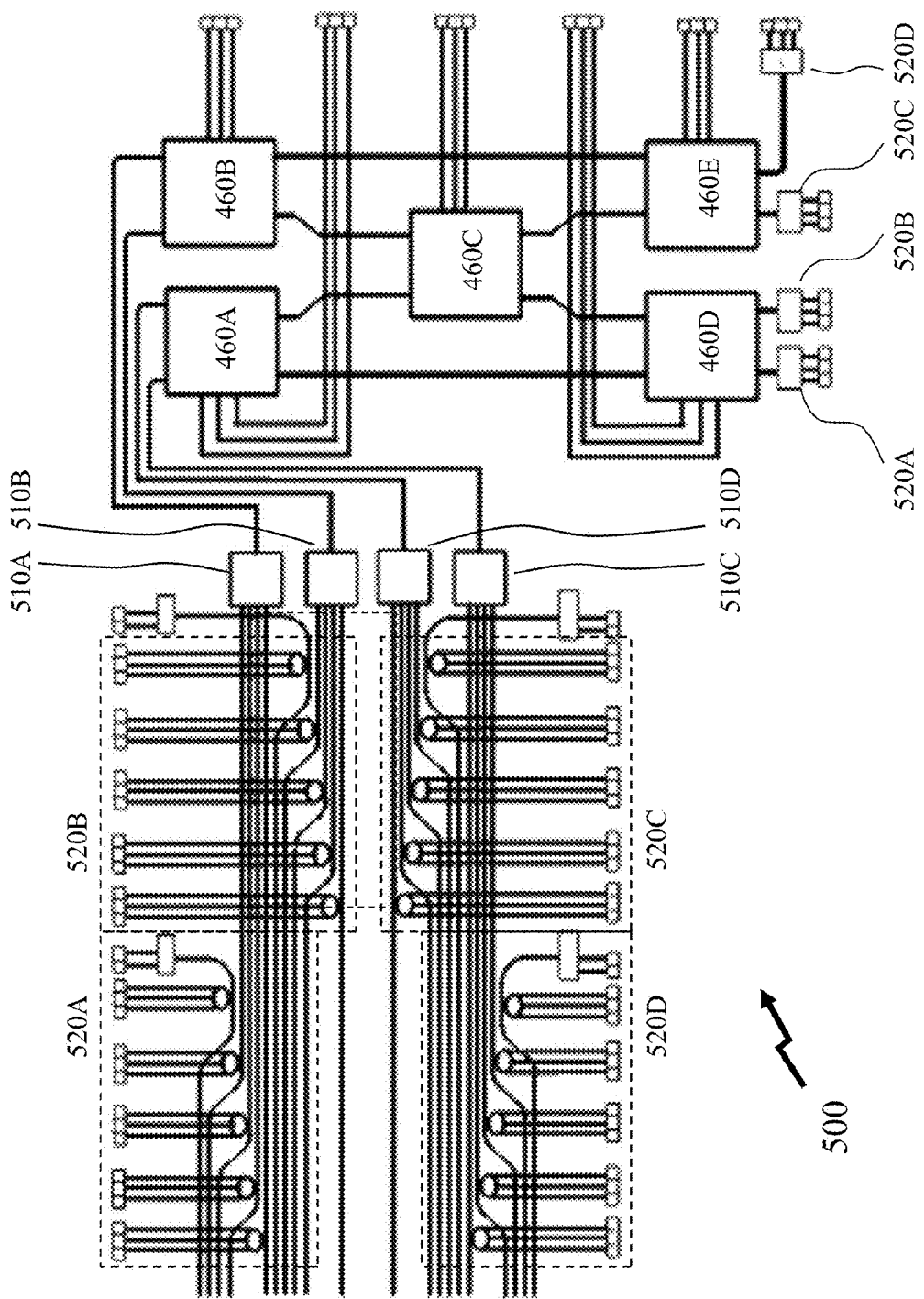
FIG. 5 depicts photonic integrated circuit solution providing the server blade routing circuit according to an embodiment of the invention.

Within the following description of embodiments of the invention a SOI PIC design is presented and discussed for an EEPSF which is based upon the Optoelectronic Systems In Silicon (OpSIS) foundry. OpSIS being a non-profit Silicon Photonics foundry and design service operated by the University of Delaware, Department of Electrical and Computer Engineering. Referring to FIG. 5 there is depicted a 4×4 core-switching matrix 500, i.e. an EEPSF, comprised of five 2×2 Mach-Zehnder Interferometer (MZI) based switches, first to fifth 2×2 Switch Elements 460A through 460E. In each of the four input optical ports of the MZI switches the optical output port of a 4×1 SOI AWG is connected, these being first to fourth AWGs 510A to 510D respectively. Each input port of each of the first to fourth AWGs 510A to 510D respectively receives an optical modulated signal from a ring resonator modulator. Accordingly, there are depicted as first to fourth modulator arrays 520A to 520D respectively. Such ring resonator structures beneficially provide for very compact amplitude modulators, which using the OpSIS foundry design guide yields modulators with a Free Spectral Range (FSR) of approximately 11 nm and an EO modulation bandwidth of 30 GHz, this bandwidth allowing support for data rates up to 40 Gb/s. Accordingly, an EEPSF as depicted in FIG. 5 may support 16×40 Gb/s=640 Gb/s throughput using 4 WDM modulated signals as optical payload and a fifth wavelength with ring resonator modulator to provide an optical label detection scheme to process destination address content within the payload. Each output port of fourth and fifth Switch Elements 460D and 460E respectively are coupled to first to fourth photodetectors 520A to 520D although as discussed supra these may be replaced by additional AWGs and multiple photo detectors.

Figure 6A:
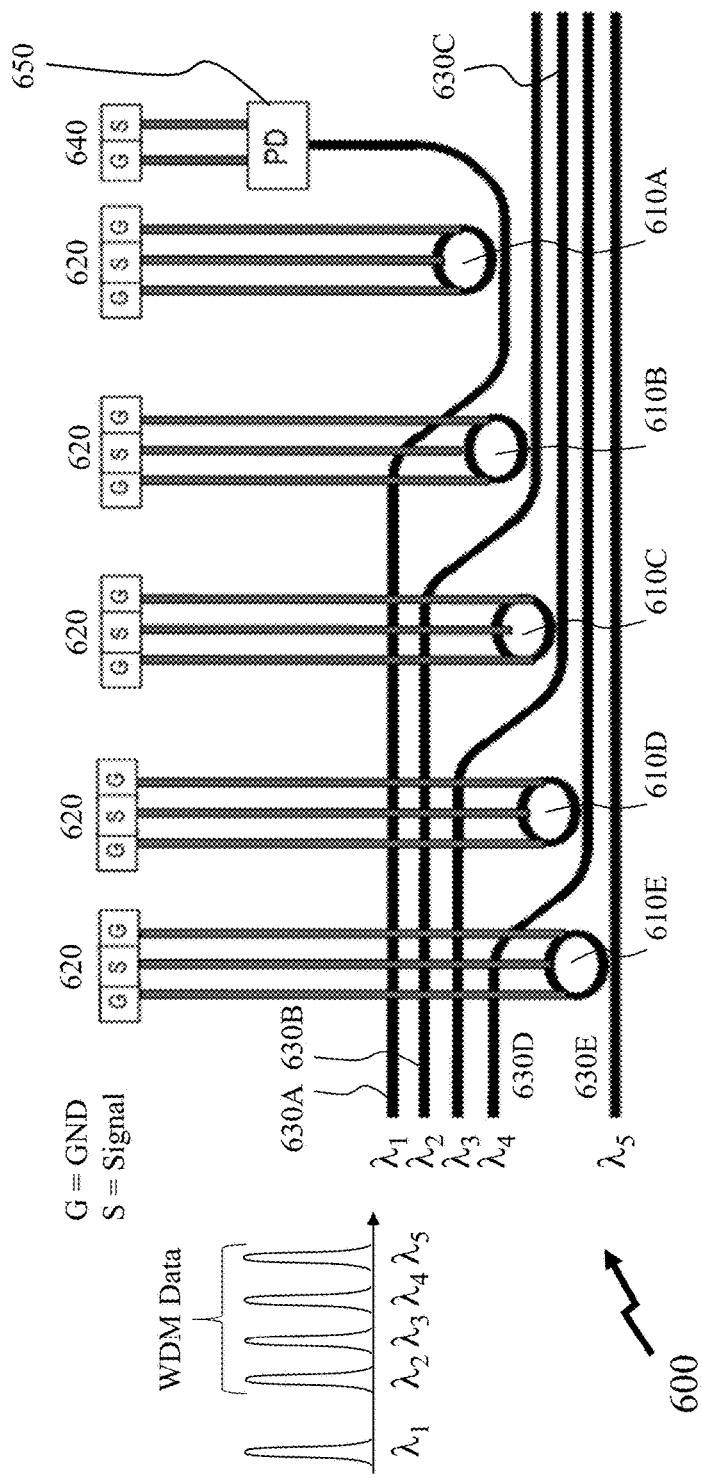
FIGS. 6A and 6B depict ring resonator modulators forming part of a photonic integrated circuit solution for server blade routing according to an embodiment of the invention.

Now referring to FIG. 6A there is depicted a Modulator Array 600, such as may provide first to fourth modulator arrays 520A to 520D respectively which form part of an EEPSF. As depicted Modulator Array 600 comprises first to fifth Ring Modulators 610A to 610E disposed with respect to first to fifth channel waveguides 630A to 630E respectively which receive input wavelengths $\lambda_1$, $\lambda_2$, $\lambda_3$, $\lambda_4$, $\lambda_5$ respectively. First channel waveguide 630A carrying $\lambda_1$ modulates the $\lambda_1$ signal with a label via first Ring Modulator 610A which is converted by on-chip photodetector 650 for electrical processing by a scheduler circuit (not shown for clarity). The converted label being coupled from the EEPSF via photodetector electrodes 640. The scheduler based upon the received labels establishes the control commands for the first to fifth 2×2 Switch Elements 460A through 460E, which as implemented via MZI switches means establishing the DC bias for the central phase shifting elements as well as potentially adjustments to DC control electrodes on the input/output 50:50 directional couplers. Whilst it would evident that the first Ring Modulator 610A modulator for the label signal may be removed from the design depicted and the scheduler circuit, e.g. a Field Programmable Gate Array (FPGA) appropriately programmed, could send directly the switching signals to the first to fifth Switching Elements 460A through 460E the inventors included the functionality to determine performance of the EEPSF elements as optionally one or more of the Modulator Arrays 600 of the EEPSF may be off-chip in some embodiments of the invention wherein the label data would be required to be extracted from the on-chip photodetector 650.

As discussed supra for an embodiment of the EEPSF implemented on the OpSIS SOI platform the circuit has four 4×40 Gbit/s WDM transmitters within the overall design. After each Modulator Array 600 a 4×1 AWG combines the four data wavelengths $\lambda_2$, $\lambda_3$, $\lambda_4$, $\lambda_5$ for routing to the optical switch matrix. Further as noted supra active device "integration" into an EEPSF requires either heterogenous integration of InGaAsP lasers on InP substrates or hybrid integration via couplers to an optical fiber interconnect between the laser array and EEPSF. Accordingly, each of the first to fifth channel waveguides 630A to 630E has disposed at its input a grating coupler, see for example Taillaert et al in "Grating Couplers for Coupling between Optical Fibers and Nanophotonic Waveguides" (Jpn. J. App. Phys. Vol. 45(8), pp. 6071-6077) and Chen et al in "Two Dimensional Silicon Waveguide Chirped Grating Couplers for Vertical Optical Fibers" (Optics Comm., Vol. 283(10), pp. 2146-2149). Alternatively, holographic lenses may be employed, see for example Gunn in "CMOS Photonics for High-Speed Interconnects" (J. Microelectronics, Vol. 26, pp. 58-66). Accordingly, the input of the EEPSF as depicted by 4×4 core-switching matrix 500 in FIG. 5 has 20 grating couplers disposed for coupling to the optical fibers carrying CW optical signals and 4 AWGs, first to fourth AWGs 510A to 510D, for combining the 4 wavelength channels for routing via the photonic switch matrix.

Figure 6B:
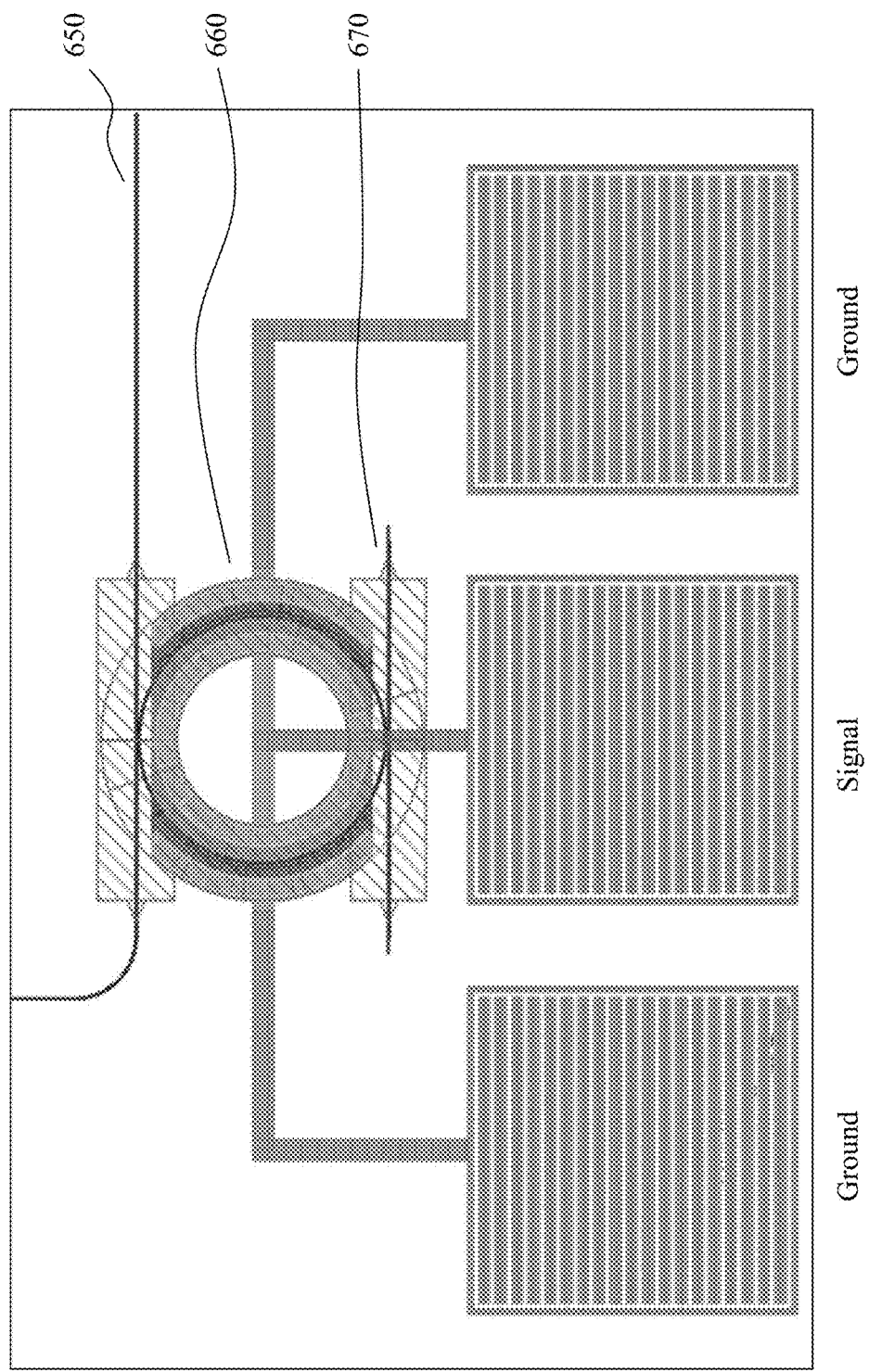

Now referring to FIG. 6B there is depicted a detail of a Ring Modulator 6000 such as providing first to fifth Ring Modulators 610A to 610E within the Modulator Array 600 in FIG. 6A. Optically the Ring Modulator 6000 is an optical ring resonator comprising waveguide 650, ring waveguide 660, and coupled waveguide 670. Waveguide 650 coupling within the EEPSF CW signals to the Ring Modulator 6000 which are then modulated independence of the electrical data supplied to the signal electrode, S, which electrically adjusts the resonance characteristics of the optical ring resonator. Exploiting the OpSIS SOI design rules then the Modulator Array 600 with on-chip photodetector requires approximately 1.7 mm×0.6 mm (approximately 1.02 mm$^2$ die area). For an example of a SOI ring resonator see Xu et al in "Micrometer-Scale Silicon Electro-Optic Modulator" (Nature, Vol. 435, No. 7040, pp. 325-327).

Figure 7:
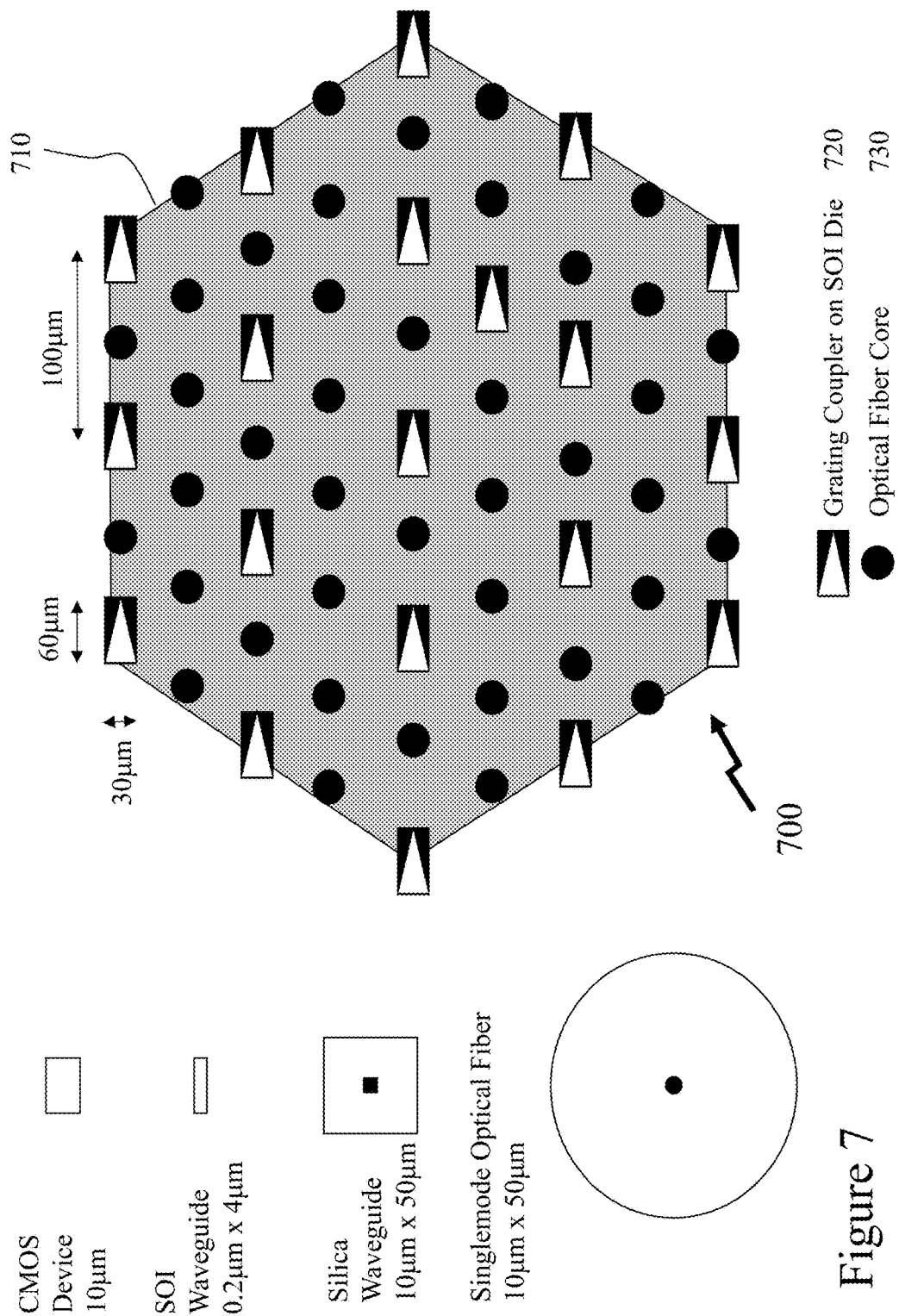
FIG. 7 depicts mapping of chip grating couplers forming part of a photonic integrated circuit solution for server blade routing with a multicore fiber output.

As described supra in FIG. 5 the EEPSF implemented as 4×4 core-switching matrix 500 requires twenty (20) CW optical signals are coupled at the input. As depicted in FIG. 7 a critical issue is the relative dimensions of the SOI waveguides and singlemode optical fiber. As shown a typical; CMOS device is defined by a scale of approximately 10 μm whilst a high index contrast SOI waveguide is ~4 μm wide with a core of width ~0.2 μm. In contrast silica waveguides, having typically a low index contrast, are ~50 μm wide with a core of width ~10 μm whilst singlemode optical fiber is 125 μm diameter with a core ~10 μm in diameter. Accordingly, a standard linear array of 20 SOI waveguides ~4 μm wide with a pitch of 12 μm occupies less than the diameter of only 2 singlemode optical fibers. Accordingly, in order to reduce the die area required for the optical input port section the inventors have exploited a single multicore optical fiber that supports 20 singlemode fibers. Referred to as a 2D Pitch Reducing Optical Fiber Array (PROFA) the multicore fiber 710 comprises 61 Optical Fiber Cores 730 disposed within a hexagonal pattern of overall diameter 620 μm. Such PROFA's manufactured by Chiral Photonics offer channels configured in a hexagonal array wherein the pitch between the Optical Fiber Cores 730 can be varied from 5 μm to 50 μm. Within the design overlap between multicore fiber 710 and grating couplers 720 depicted in schematic 700 in FIG. 7 the inventors in utilizing the hexagonal shaped multicore fiber array established a design leaving one Optical Fiber Core 730 between the rows and within each row. Accordingly, the 20 Grating Couplers 720 are mapped to the 61 Optical Fiber Cores 720. Due to the design of the PROFA the multicore fiber 710 fans out to 61 optical fibers allowing the 20 required singlemode fibers to be spliced to the CW sources.

Through the ability to provision low radius bends within the high index contrast SOI waveguide platform, ~10 μm, the 20 SOI channel waveguides can be easily routed from this group of grating couplers to the inputs of the 20 ring resonator modulators. The total area required for the array of 20 grating couplers in FIG. 7 is ~0.16 mm$^2$, substantially reducing the optical input port area of the EEPSF. Accordingly, it would be evident that with the 61 Optical Fiber Cores 720 within multicore fiber 710 that alternate EEPSF designs could be supported with minor design adjustments, including for example 8×70 Gb/s using 8 7-channel modulator arrays, 6×100 Gb/s using 6 10-channel modulator arrays, and 15×40 Gb/s using 15 4-channel modulator arrays as well as others. Alternatively, multicore fibers 710 with reduced/increased fiber counts can be provided.

As discussed supra between each Modulator Array 600 and an input to the switching matrix there is disposed 4×1 SOI AWG based WDM. Based upon the 11 nm FSR of the OpSIS standard ring resonator design cell these 4 optical channels can be spaced by 400 GHz (3.2 nm). Beneficially, such a N×100 GHz grid is compatible with WDM telecommunications standards and accordingly discrete laser and/or laser arrays exist upon a standard grid with 100 GHz spacing. Accordingly, in other embodiments of the invention a modulator array+AWG WDM may be replaced with a single input port accepting a WDM optical signal from a remote element and/or a photodetector/AWG WDM with photodetector array can be replaced allowing the WDM optical signal to be routed to a remote element. For example, using a 15×40 Gb/s design with an 16×16 optical switch the additional input/output port can be for routing to other electronics and/or other equipment rather than to which the EEPSF is directly integrated. Using the design calculations of Pathak et al in "Optimized Silicon AWG with Flattened Spectral Response Using an MMI Aperture" (J. Lightwave Tech., Vol. 31(1), pp. 87-93) the inventors established a 4-port 100 GHz AWG would require approximately 400 μm×300 μm, i.e. ~0.12 mm$^2$ of chip area.

Figure 4:
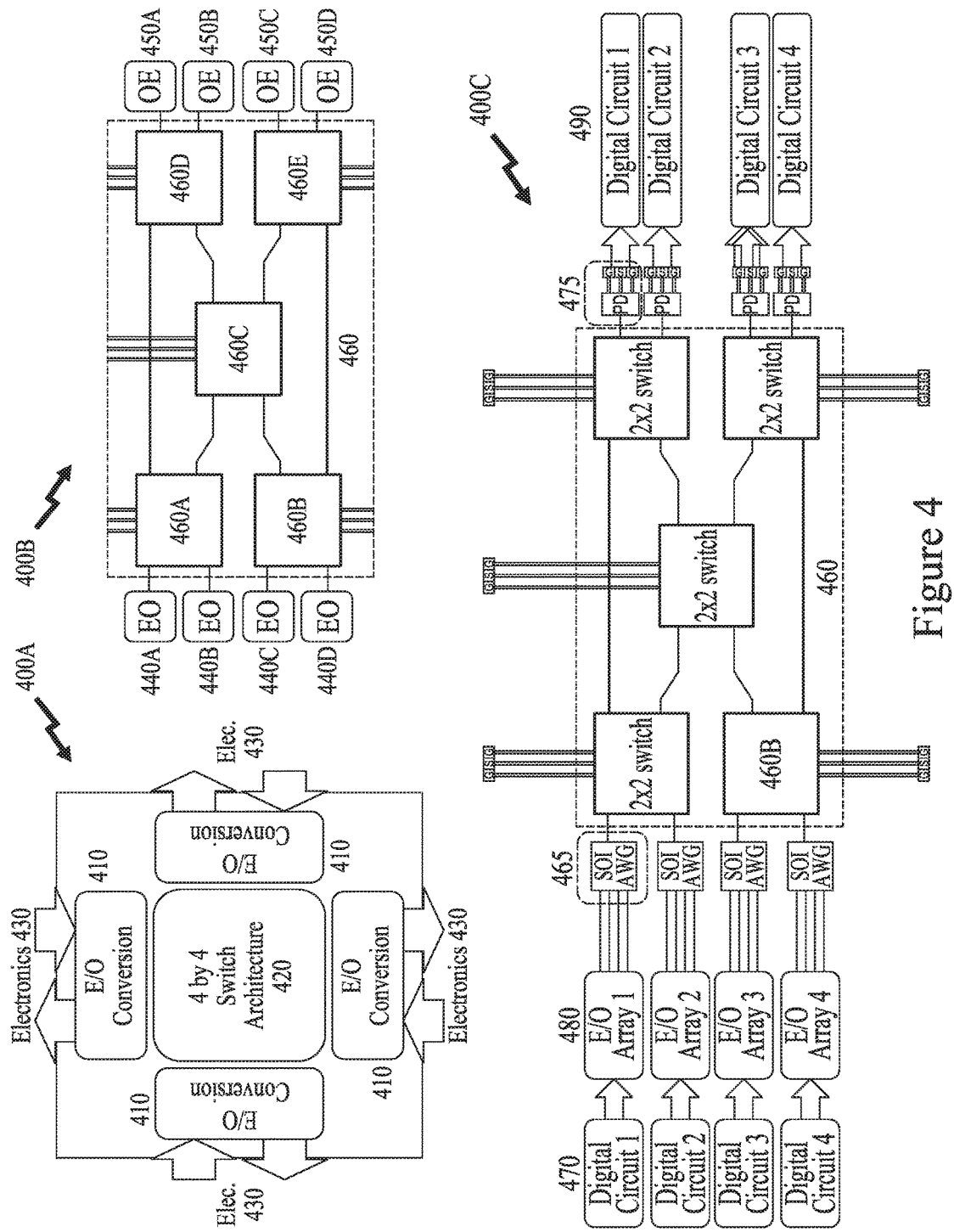
FIG. 4 depicts a server blade routing circuit according to an embodiment of the invention for reconfigurable photonics interconnect within a server blade.

As depicted in FIGS. 4 and 5 the 4×4 optical switch employs 5 MZI 2×2 switch elements. The active section of each SOI MZI, i.e. the PIN diode section, is approximately 300 μm long which is lower than that when compared to a high speed Mach-Zehnder modulator, because in MZI switches the active section is a forward biased PIN diode, which require lower phase shifter length to produce the required π phase shift. Due to the broadband nature of the input signal to the MZI switches, around 9.6 nm bandwidth for four 100 GHz spaced channels, the input and output 50:50 couplers of the MZI were implemented with high bandwidth multimode interference (MMI) couplers rather than the typically narrowband directional coupler. Based upon calculations by the inventors the length of a 6 μm wide MMI coupler should be approximately 127 μm. Accordingly, the total length of each MZI 2×2 switch is approximately 550 μm and their width approximately 350 μm. As the electrical driving signal of the switches will typically be low speed, say 300 MHz to 500 MHz, compared to the multigigabit drive signals to the modulators, the electrode design for the switches can be compact, and rapid transitions within the electrical control line may be provided to reduce die footprint.

Figure 8:
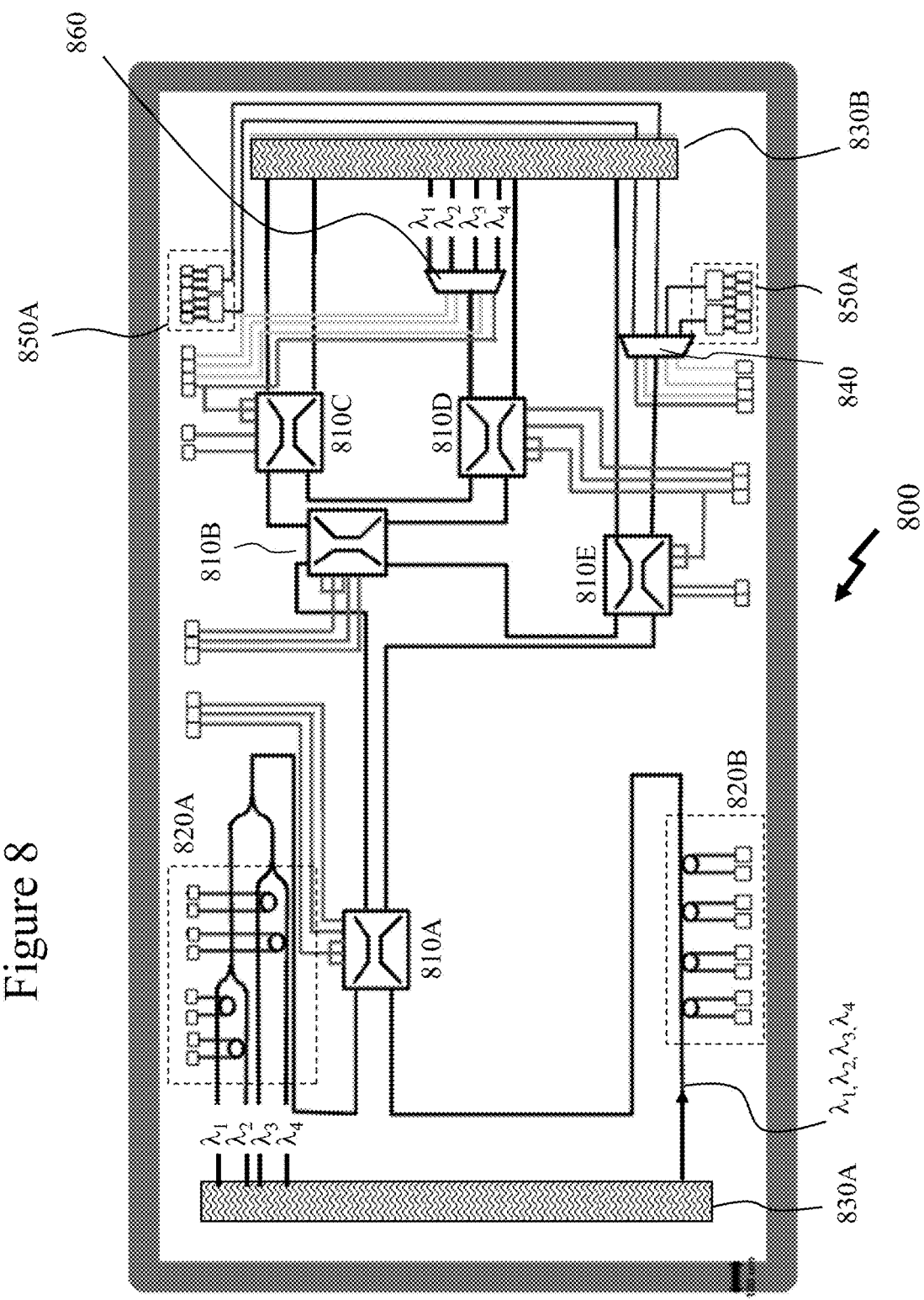
FIG. 8 depicts a circuit schematic for a photonic integrated circuit solution providing the server blade routing circuit according to an embodiment of the invention.
Figure 9:
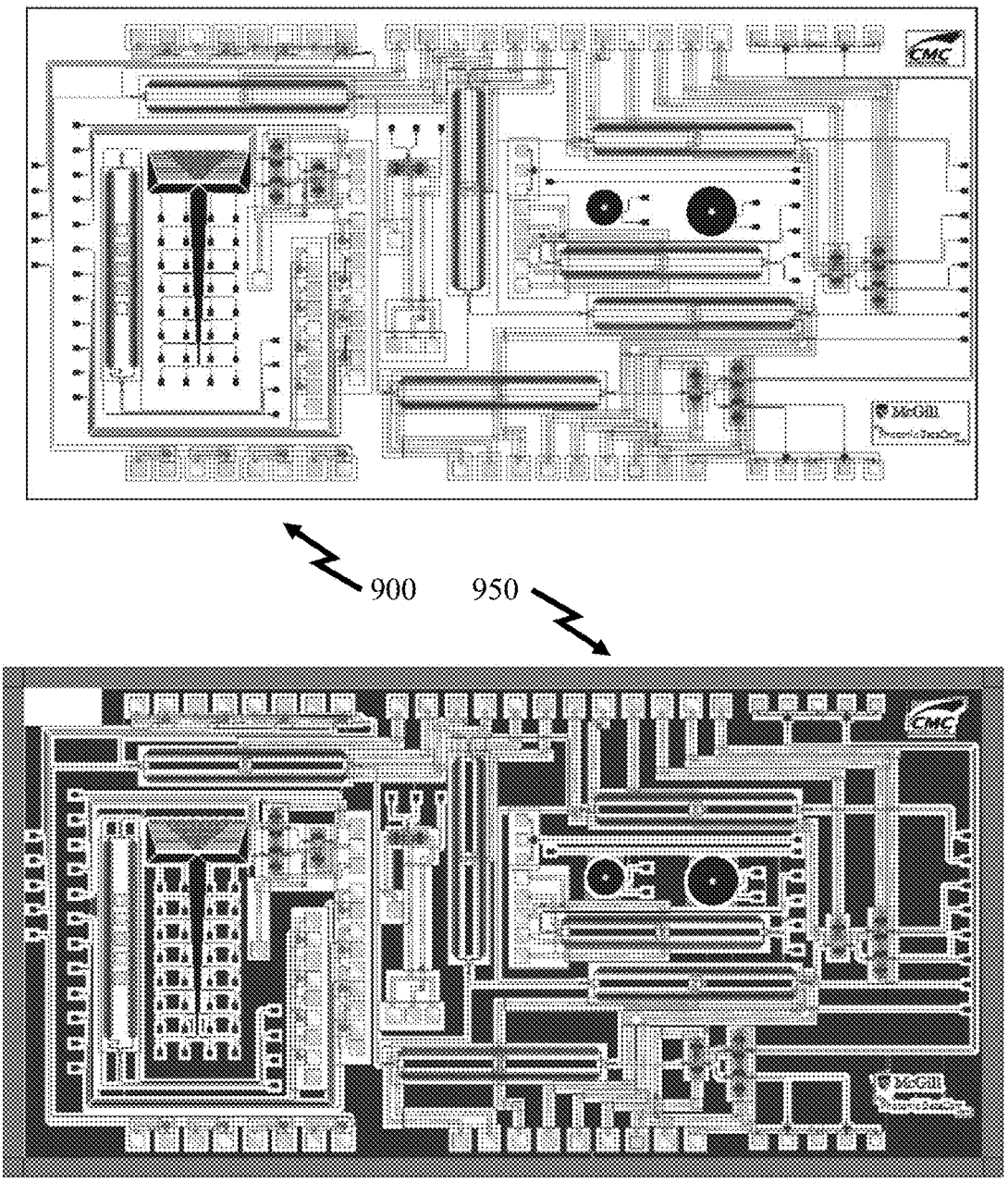
FIG. 9 depicts a silicon photonic integrated circuit solution providing a server blade routing circuit according to an embodiment of the invention prior to final mask tiling and after being tiled.

At the output of the 4×4 optical switch single ended photodetectors have been employed within the exemplary embodiment of the invention presented herein requiring approximately 300 μm×200 μm, i.e. ~0.06 mm$^2$ of chip area. In contrast the photodetectors for label detection are of lower data rate and therefore can be designed with only Ground-Signal (GS) electrodes rather than the coplanar Ground-Signal-Ground of the high speed photodetectors. Accordingly, these label photodetectors are smaller requiring approximately 200 μm×200 μm, i.e. ~0.04 mm$^2$ of chip area As the inventors were fabricating a proof-of-concept (POC) 4×4 EEPSF upon the OpSIS foundry then the overall die was designed to fit one of the supported chip block size in an OpSIS run, this being a 5 mm×2.5 mm die (i.e. die area of 12.5 mm$^2$) as the design of the 4×4 EEPSF requires a die approximately 5 mm×2 mm (i.e. die area of 10 mm$^2$). Optionally, an efficient thermal tuning circuit may be integrated with the EEPSF architecture requiring additional DC electrical lines to the die. Depicted in FIG. 8 is a schematic of the POC 4×4 EEPSF (POC4) 800 according to an embodiment of the invention which is then also shown as compiled mask levels in FIG. 9 in untiled 900 and tiled 950 formats respectively for integration with an OpSIS foundry run. As depicted in FIG. 8 the POC4 comprises an input coupler 830A coupled to a modulator array 820A, such as described supra in respect of FIGS. 6A and 6B respectively, and a serial modulator array 820B. These are then coupled to first switch element 810A, the outputs of which are coupled to an input port of each of second and fifth switch elements 810B and 810E respectively. An output port of second switch element 820B is coupled to the other input port of fifth switch element 820E. The output ports of fifth switch element 820B are coupled to second grating coupler directly and first AWG demultiplexer (DMUX) 840. Two outputs of the DMUX 840 are coupled to first photodetector pair 850A whilst the other pair of outputs are coupled to second photodetector pair 850B.

The other output port of the second switching element 820B is coupled to fourth switching element 820D whilst it's other input port is coupled to third switching element 820C. Third switching element 820C is also coupled to fourth switching element 820D. Inputs to the third switching element 820C are single channel waveguides coupled from the second grating coupler 830B whilst the remaining ports of fourth switching element 820D are coupled to the second grating 830B directly or via WDM 860. Accordingly, by appropriate control of the first to fifth switching elements 820A through 820E respectively single wavelength signals and/or WDM optical signals may be coupled to the POC4 800 to characterize the multiple optical elements such as ring resonators, 2×2 MZI switches, AWG MUX/DMUX, grating coupler, and on-chip photodetectors as well as MMI couplers, PIN diode phase shifters, and high speed RF electrical lines allowing the feasibility of an EEPSF operating at 16×40 Gb/s=640 Gb/s aggregated data rate on-chip with separate electrical label detection for the schedulers and around 300-500 MHz switching speed to be demonstrated.

Figure 10A:
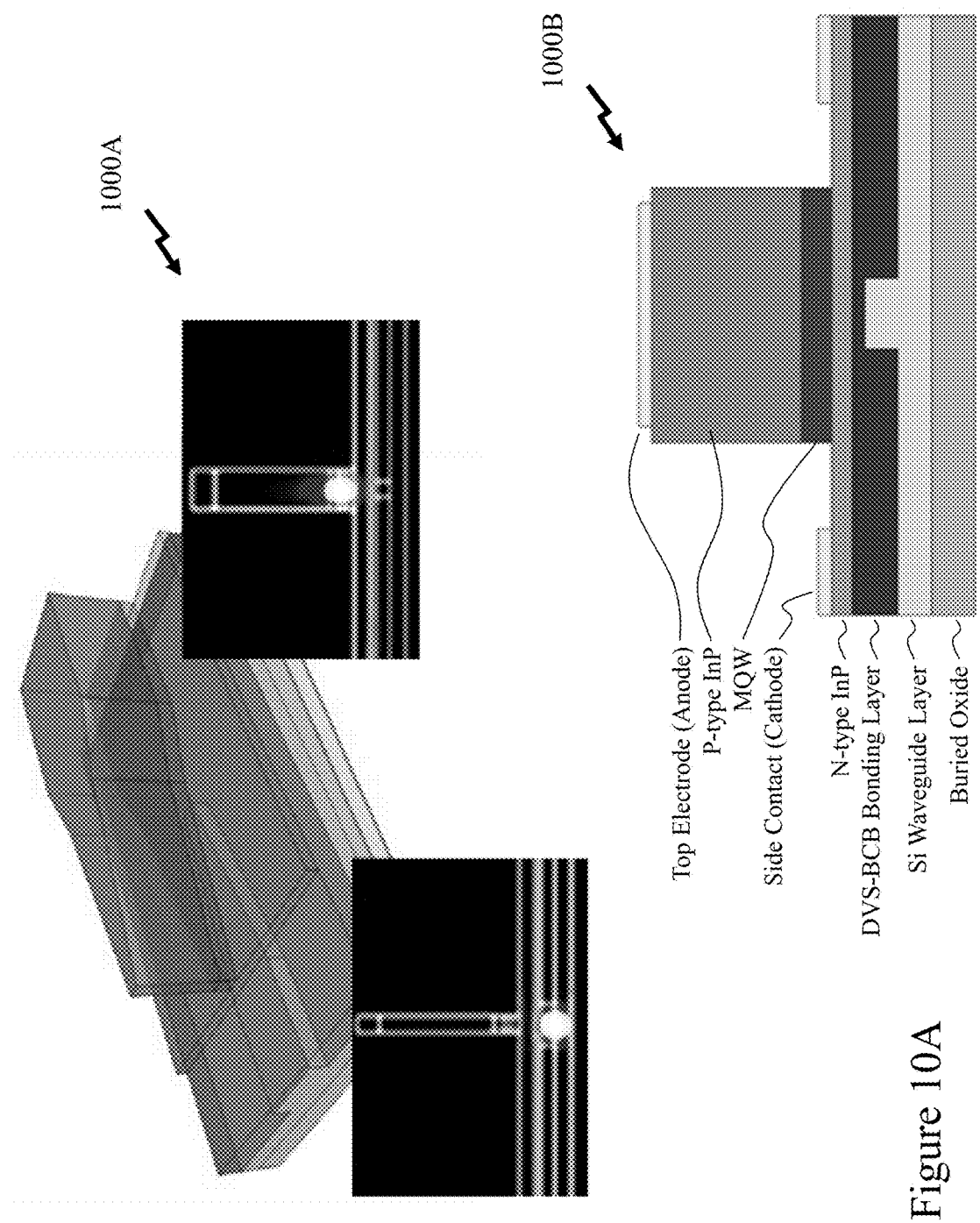
FIGS. 10A and 10B depicts heterogenous active device integration methodologies for InP active device integration with silicon photonic integrated circuit solution according to an embodiment of the invention.
Figure 10B:
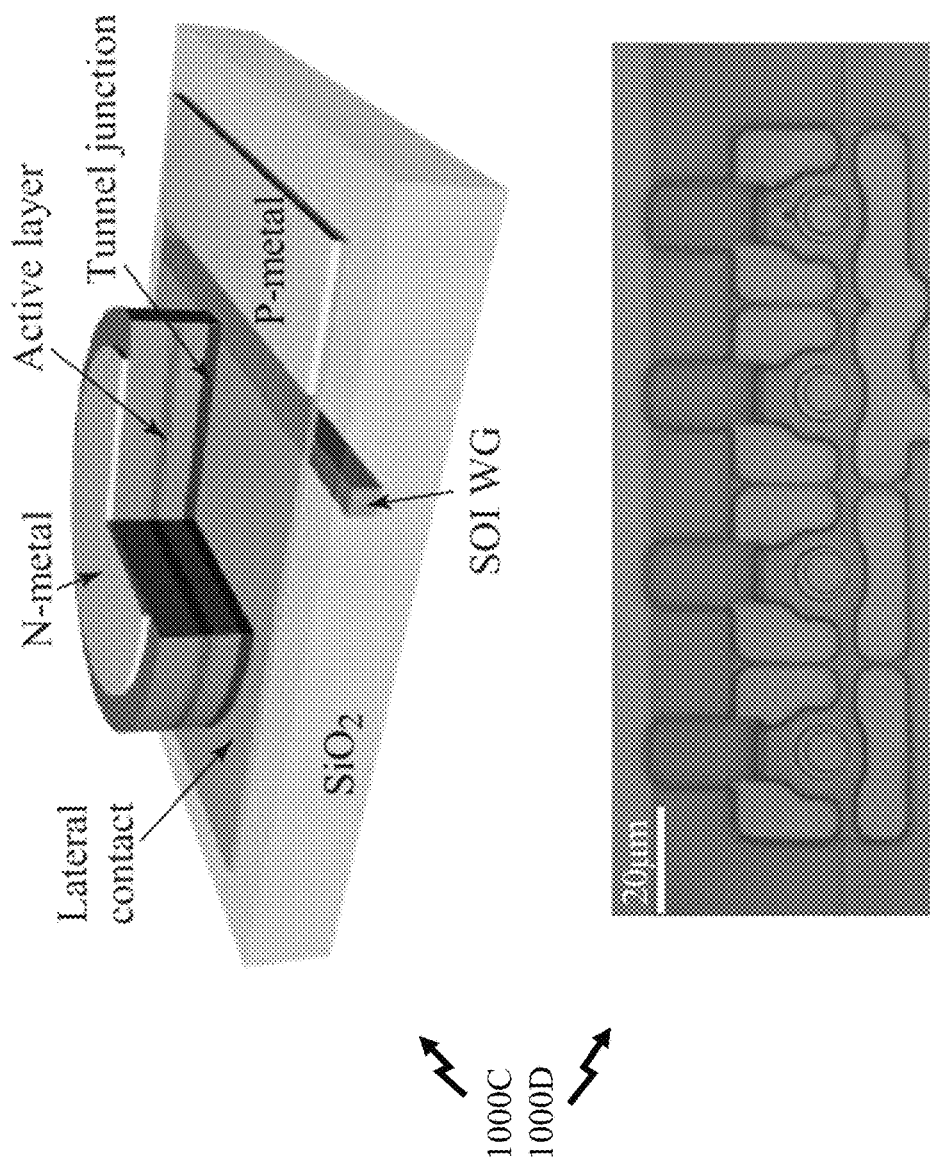

As discussed supra EEPSFs have been described with external CW laser and/or external modulated WDM inputs from externally provisioned lasers. However, as depicted in FIGS. 10A and 10B respectively heterogenous integration of active InP based lasers may be provided upon the SOI EEPSF platform described by the inventors. First and second images 1000A and 1000B in FIG. 10A depict schematic 3D view and 2D cross-section for a hybrid integrated InP laser with a SOI channel waveguide, see for example Lamponi et al in "Low-Threshold Heterogeneously Integrated InP/SOI Lasers with a Double Adiabatic Taper Coupler" (Phot. Tech. Lett., Vol. 24(1), pp. 76-78) exploiting divinylsiloxane-bis-benzocyclobutene (DVS-BCB) wafer bonding between the flipped InP die and SOI die. To enhance mode coupling efficiency both the III-V waveguide and silicon waveguide are tapered. Alternatively, a low temperature oxygen plasma assisted bonding process may employed without any intervening material, e.g. DVS-BCB, see for example Fang et al in "Hybrid Silicon Evanescent Devices" (Materials Today, Vol. 10(7-8), pp. 28-35). Alternatively, referring to FIG. 10B, as depicted in third image 1000C very compact CW optical sources may be integrated using InP microdisk laser geometries heterogeneously coupled to the SOI platform, see for example Campenhout et al in "A Compact SOI-Integrated Multiwavelength Laser Source Based on Cascaded InP Microdisks" (Phot. Tech. Lett., Vol. 20(16), pp. 1345-1347). As depicted in fourth image 1000D Campenhout demonstrated a 4 wavelength multiwavelength laser within a footprint of approximately 120 μm by 30 μm and it would be evident therefore that a parallel array with 4 waveguides coupling to ring resonator modulators would not be significantly larger.

Within the embodiments of the invention described supra the optical inputs and outputs to the optical switching matrix within the EEPSF are described as being either fully multiplexed/demultiplexed within the SOI chip or passed through without processing wherein they are received from external equipment coupled to the EEPSF. However, in other embodiments of the invention an input and/or output channel may be partially multiplexed/demultiplexed through use of other MUX/DMUX designs such as, for example, a serial MZI filter wherein a predetermined band of the total bandwidth may be combined/separated and routed separately to the remaining channels. For example, in an 8 channel WDM design an initial interleaver may separate alternate 100 GHz channels wherein the odd channels, 1, 3, 5, and 7 are routed to external equipment as a CWDM 200 GHz 4-channel stream and the even channels, 2, 4, 6, and 8 are demultiplexed with a 200 GHz WDM. The reverse being feasible also for an on-chip 4 wavelength 200 GHz signal comb to be combined with an off-chip 4 wavelength 200 GHz signal comb via an interleaver. In such instances two additional channels may be provided to indicate label data for the scheduler circuit in respect of both the on-chip and off-chip or alternatively only a channel for the off-chip signals is required. Alternatively, a bandpass filter may be implemented allowing, for example, a 6 wavelength 100 GHz WDM channel exploiting a 4 channel AWG in conjunction with a bandpass MZI filter adding the additional 2 wavelengths from an optical interconnection which may, for example, have been demultiplexed using a similar bandpass—AWG combination after the optical switching matrix core of another EEPSF forming part of an electronic circuit pack exploiting multiple EEPSFs or from another electronic circuit pack, e.g. blade server.

Within the embodiments of the invention presented supra modulation within an EEPSF has been presented exploiting ring resonator modulators. However, it would be evident that other external modulator devices may be used including, but not limited to, Mach-Zehnder interferometer modulators and directional couplers, Similarly, it would be evident that such modulators as well as ring resonator modulators may also be heterogeneously integrated as well as monolithically integrated and designed with different electrical bandwidths/datarate specifications, e.g. 5 Gb/s, 10 Gb/s, 12.5 Gb/s, 15 Gb/s, 20 Gb/s, 30 Gb/s, etc. according to the overall requirements of the EEPSF and the number of wavelengths implemented.

It would also be evident that in addition to blocking switch matrix designs that strictly non-blocking and re-arrangeably non-blocking switch architectures may be employed. Further, architectures supporting full and/or partial distribution as well as switching may be provided allowing, for example, in considering the architecture of FIG. 3 the MicroProcessor 320 can simultaneously provide data to Memory 310 and Top of Rack (TOR) Switch 330. It would also be evident that additional wavelengths may be provided for providing clock distribution and/or synchronization signals to other circuits connected to the EEPSF.

Within embodiments of the invention devices may be implemented operating, for example, at 1300 nm and 1550 nm using silicon-on-insulator waveguides. Alternatively silicon-on-insulator and silicon oxynitride on insulator waveguides may be employed for devices operating at 850 nm exploiting GaAs sources and germanium or silicon-germanium photodetectors. Additionally, devices described herein exploit conventional rib waveguide geometry SOI waveguides although it would be evident that alternate designs including for example nanostructures may be implemented. Equally, alternative modulator designs, MUX/DMUX designs etc. may be employed.

3. Photonic Swtiching Fabric Controller

As discussed supra traditional copper-based electrical interconnects become a bottleneck due to power consumption constraints and throughput limitation. Optical interconnects are promising approaches providing larger bandwidth with potentially lower power consumption. Specifically, silicon photonics (SiP) has attracted widespread attention due to its existing process fabrication infrastructure leading to potentially lower cost processes, and its high integration density. Furthermore, by co-packaging with integrated electronic drivers and controlling application specific integrated circuits (ASICs), SiP can provide versatile functionalities to high-speed systems based on Optical Networks-on-chips (ONoCs).

However, to dynamically reconfigure the resources in an ONoC platform, large port count and low latency optical switching fabrics are required. Whilst controllers for a range of optical switching fabrics have been demonstrated, further development of the controllers is necessary for practical and successful deployment of integrated optical switching fabrics. In this section the inventors demonstrate experimentally demonstrate a prototype of a centralized controller co-designed for a 4×4 SiP exploiting Mach-Zehnder interferometer (MZI)-based switch elements. The controller, entitled a Look-Up Table Centralized Controller (LUCC) by the inventors, makes its decision in one single clock cycle, and resolves contention. An embodiment of the LUCC was implemented in an FPGA and employed to routes 10 Gb/s optical payloads.

3A. Co-Design of the Controller

Figure 11A:
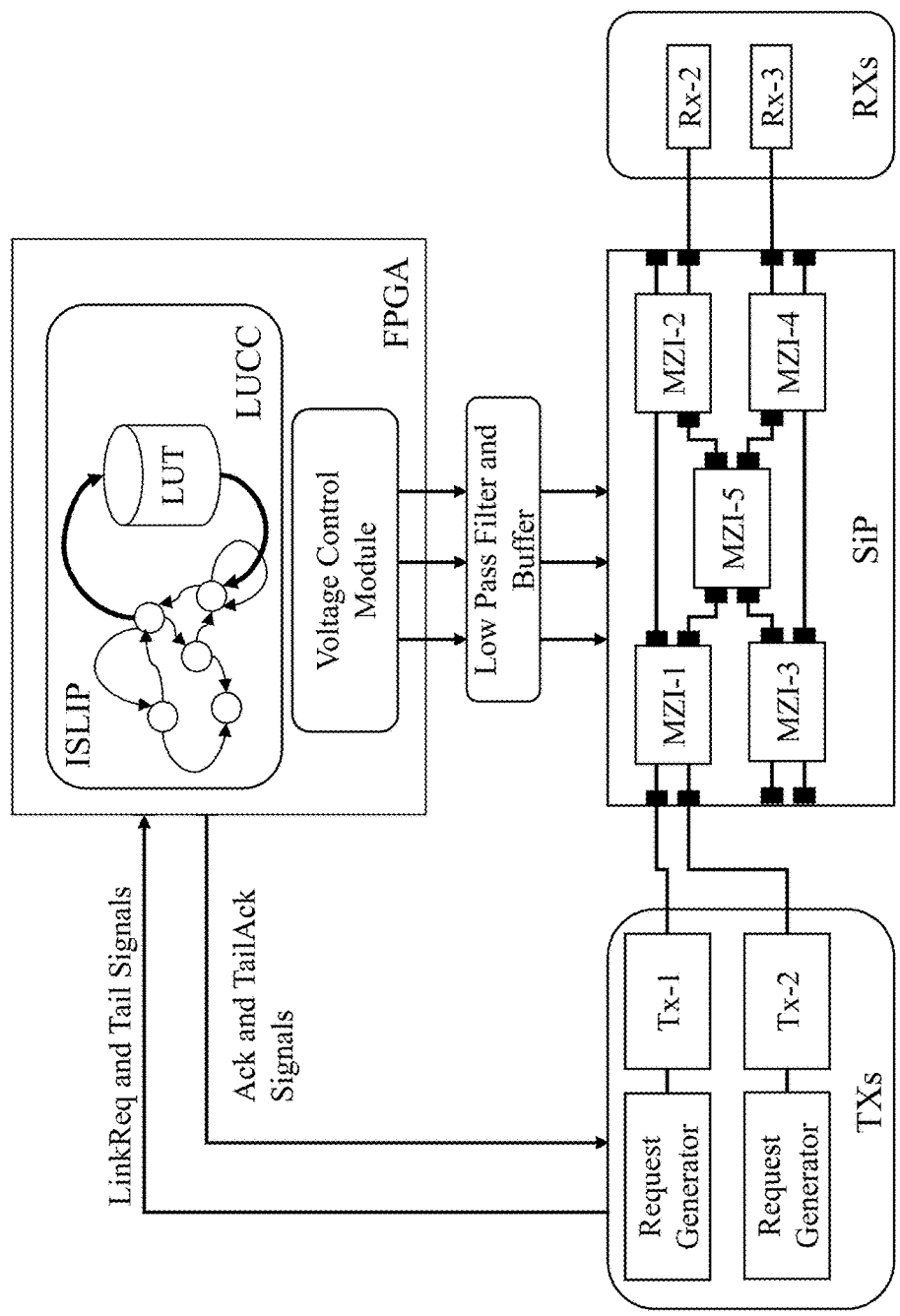
FIG. 11A depicts a schematic of an FPGA-based Look-Up Table Centralized Controller (LUCC) according to an embodiment of the invention together with a multistage photonic switch.

The schematic of the prototyping controller architecture for the optical switch is depicted in FIG. 11A. It includes an FPGA-based controller, the LUCC, a 4×4 optical switch, transmitter (TX) and receiver (RX) nodes. The integrated SiP switch used in the co-design is a 4×4 optical switch in a Spanke-Benes topology with five integrated 2×2 MZIs directly controlled by LUCC. Carrier injection tuning method is employed to bias one arm of the MZI for high-speed and efficient switching. The SiP chip was fabricated by the IME foundry and the measured voltage length product ($V_\pi L$) and switching times of ~0.18V·mm and ~6 ns respectively. The LUCC was specifically designed to achieve low latency scheduler decisions and may be configured for different interconnect topologies. The LUCC enables all MZI connections to be established within one clock pulse. This enables minimum delay when the switch configuration dynamically changes in packet-based applications. In order to achieve low-latencies, the LUCC is designed to rely on look-up tables (LUTs) with a modified iSLIP algorithm for decision, and for conflict resolution, The Dijkstra algorithm for shortest possible routes is used. For contention, a Round-Robin (RR) algorithm is used to determine which transmitter is granted access, the LUCC receives requests, solves conflicts and grants access to the network in one clock cycle.

Figure 11B:
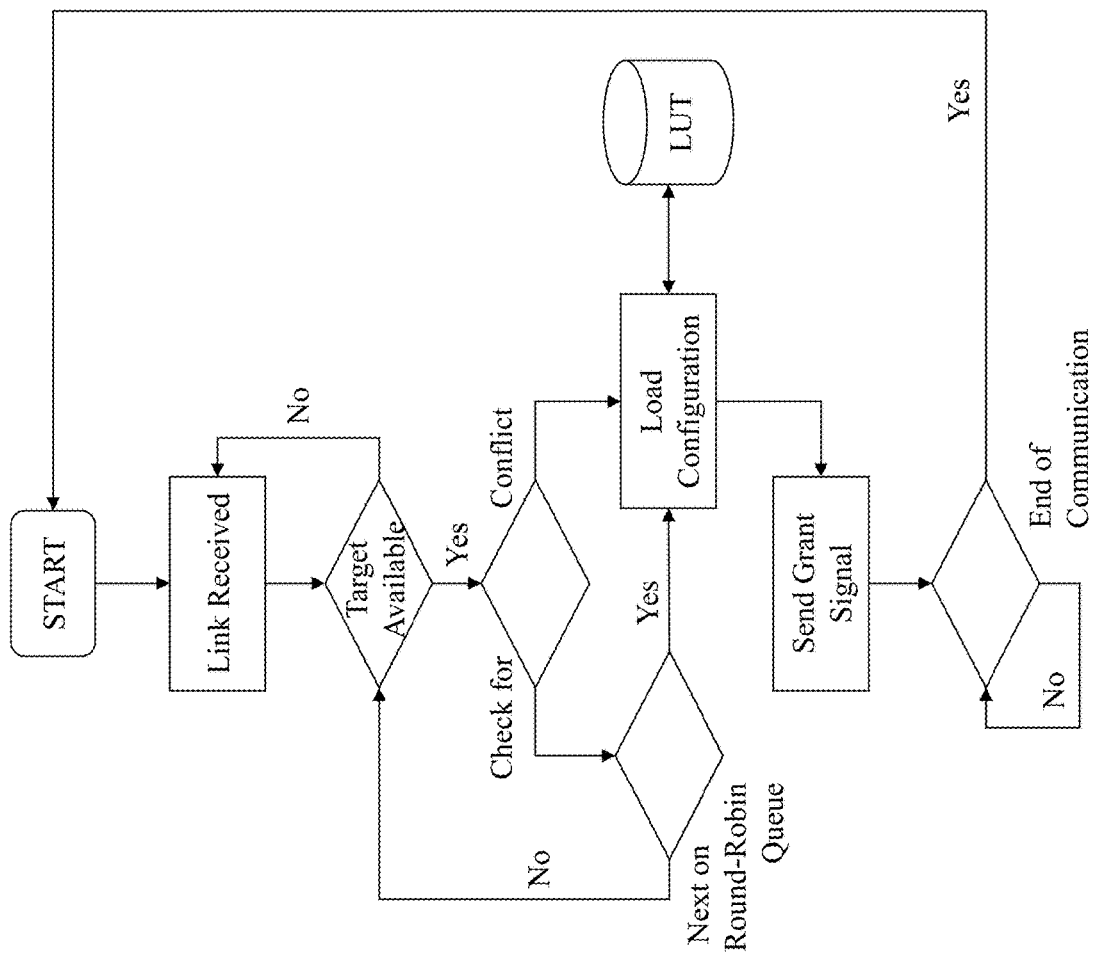
FIG. 11B depicts a decision flow chart for a LUCC according to an embodiment of the invention.

The flow chart in FIG. 11B depicts the decision making process of LUCC. Transmitters (TXs) firstly send their link requests (LinkReq) to the LUCC, which then checks the availability of the target optical paths. In case no path is available, the data packets at the TXs wait in the Round-Robin queues, where the controller handles link requests from TXs in a circular manner. In case of a granted request, the LUCC configures the multiple MZIs to the desired states (bar or cross) through a LUT corresponding to the switch topology, As such, the LUCC's architecture can be programmed through its LUT to account for a different topology. Its scalability limitation in terms of the number of ports and stages that a topology may have is mainly limited by the memory available for the LUT. Once LUCC configures the switch, an acknowledgement signal (Ack) is fed back to the TXs enabling the optical packet generation process.

Due to the impact of process variation in SiP fabrication and its impact on the phase delay difference of the MZI switches, the required switching voltages are actually different for each MZI within the same die. Whilst heaters can be included to compensate for these inherent variations in the phase bias of each MZI via the thermos-optic effect of the waveguides, it leads to non-trivial power consumption and increased complexity as the number of switch ports scales. To mitigate further control requirements at the interface to the switch, the centralized controller employs a simple electrical pulse-width modulation (PWM) method was employed to convert the controlling signal to the desired bias voltage for each individual MZI switch. This approach mitigates the need for thermo-optic phase trimmers leading to a more energy-efficient solution. As illustrated in the FPGA implementation in FIG. 11A, the repetitive voltage pulse trains of the PWM are generated by the voltage control module and applied to a low-pass filter and an operational amplifier buffer. The accurate switching voltages are extracted based on the duty cycle of the pulse trains. Hence, the desired bias voltages can be accurately obtained by changing the duty cycle of the voltage pulse train, taking into account the impact of process variations and potentially changes in the MZI bias voltages due to temperature changes.

Figure 12B:
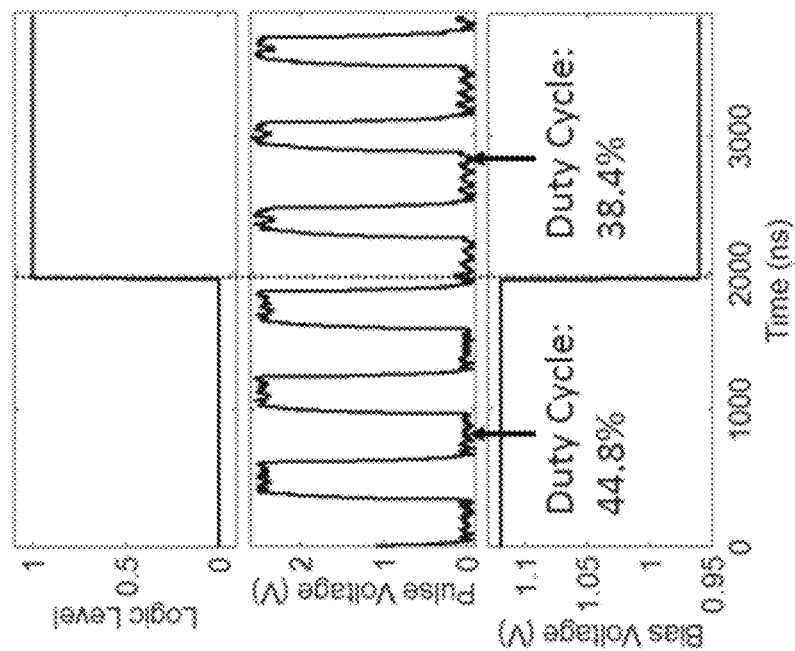
FIGS. 12A and 12B depict a bias voltage adjustment technique using a Pulse-Width Modulation (PWM) method: showing that the bias voltage is linearly proportional to the duty cycle and the output high and low voltages from the controller to one photonic switch with corresponding duty cycle.
Figure 12A:
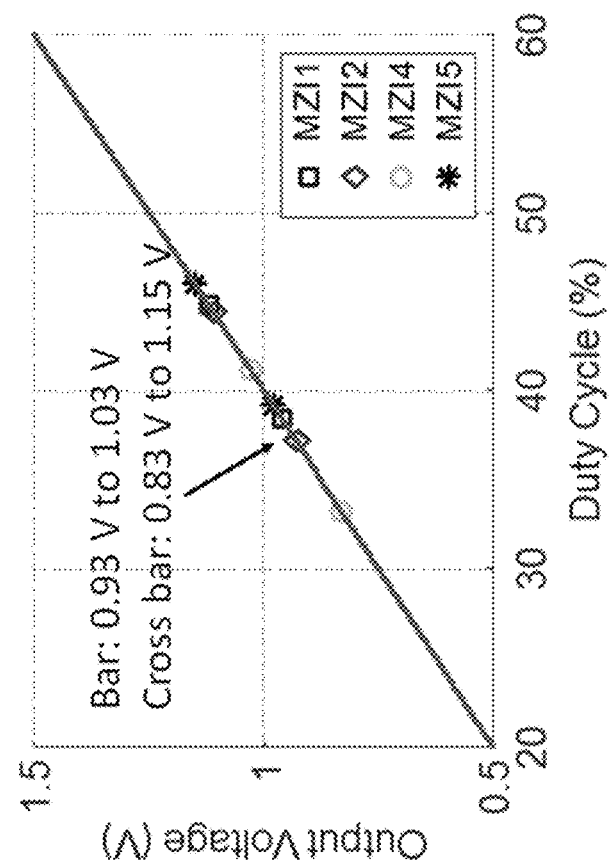

FIGS. 12A and 12B illustrate the method used to accurately bias the MZIs for optimum extinction ratio between the bar and cross configurations. Essentially, the bias voltage to the MZI switch is linearly proportional to the duty cycle of the voltage pulse train from the voltage control module. In this current implementation, the adjustable resolution is 80 mV in the range between 0V (0% duty cycle) and 2.5V (100% duty cycle). The resolution can be increased by adding bits and four bits are used here. As illustrated in FIG. 12B to enable the switching of the first MZI switch (MZI1), the applied bias voltage is 0.96V (bar state) and 1.12V (cross state). This was enabled by adjusting the duty-cycle of the voltage pulse trains to 44.8% for the cross bar state which corresponds to a logical "0" in the decision made by LUCC. The bar state voltage (0.96V) is obtained by adjusting the duty-cycle to 38.4%. With such an approach, the technique can account for changes in the switching voltage due to process variations and/or temperature changes. For this specific SiP switch, the variations seen in the required bias voltages of the other MZI switches are ±50 mV for the bar state, and ±160 mV for cross bar state [FIG. 12A]. In a deployed solution, the controller would be calibrated with all the required switch voltages while a feedback control can be implemented within the control to take into account changes due to temperature.

3B. Demonstration

The proof of concept for the prototype is depicted in FIG. 11A. Two transmitter nodes (Tx1 and Tx2), and two destination nodes (Rx2 and Rx3) are considered. Experimentally, the 10 Gb/s optical payload is injected into one of the transmitters. At the destination node Rx, the output signal is monitored to verify the switching performances. The time diagrams are depicted in FIG. 13A where the MZI's states (0) and (1) denote bar and cross states of the MZI, respectively. The request state (−1) of the Tx's denotes the idle state.

After one request (LinkReq), LUCC takes only one clock cycle to send an Ack signal triggering the start of the optical communication between the source and destination ports. The switches configuration is set within that same clock cycle. The order of the four bits of the controller digital signals LinkReq, Ack, Tail and TailAck in FIG. 13A corresponds to TX4, TX3, TX2 and TX1, respectively, Where (0) denotes the "off" state and (1) denotes the "on" state.

When a conflict occurs where the RX destination node is the same for two or more transmitters (TX1 and TX2 in FIG. 11A), the data packet from TX2 is delayed in the Round-Robin (RR) queue until TX1 finishes its communication. FIG. 3B illustrates the contention resolution of LUCC where a CW light is injected into TX1 and TX2. The normalized light power is monitored while the injected traffic is the same as shown in FIG. 13A. Where TX1 has higher priority in the case of a contention. Then the 10 Gh/s payload from TX1 is injected into the switch fabric via grating couplers, and converted into electrical signals at the RX2. The difference in optical power is due to non-uniform insertion loss of the Spanke-Benes topology. FIG. 13C depicts the large extinction ratio of the received electrical signals when the target optical path is either the "ON" or "OFF" state.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device for interconnecting a plurality of N electronic server elements of a server blade, the device comprising;
  a monolithic photonic circuit provided within the server blade, the monolithic photonic circuit incorporating an N×N optical switch wherein,
    each input port of the N×N optical switch being coupleable to a corresponding one of the plurality of N electronic server elements within the server blade;
    each output port of the N×N optical switch being coupleable to a corresponding one of the plurality of N electronic server elements within the server blade;
    the monolithic photonic circuit incorporating a plurality of electro-optic (E/O) arrays, a plurality of channel wavelength multiplexers, and at least one optical detector;
    the input ports of the N×N optical switch being coupleable to corresponding ones of the plurality of N electronic circuits via corresponding ones of the plurality of electro-optic arrays and corresponding ones of the plurality of channel wavelength multiplexers, each E/O array generating a plurality of wavelengths multiplexed to each other via a corresponding one of the plurality of channel wavelength muitiplexers; and
  each of the output ports of the N×N optical switch being coupleable to the corresponding one of the plurality of N electronic circuits via the at least one optical detector;
  wherein the E/O arrays generate the plurality of wavelengths offset relative to each other in time, the at least one optical detector being provided in the form of a broadband detector for detecting the plurality of wavelengths offset relative to each other in time.

* * * * *